United States Patent
Jwa et al.

(10) Patent No.: US 12,373,077 B2
(45) Date of Patent: Jul. 29, 2025

(54) SPLIT SCREEN LAYOUT CONTROL

(71) Applicant: SAMSUNG ELECTRONICS CO., LTD., Suwon-si (KR)

(72) Inventors: Yeonjoo Jwa, Suwon-si (KR); Minho Yang, Suwon-si (KR); Eunsil Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/433,898

(22) Filed: Feb. 6, 2024

(65) Prior Publication Data

US 2024/0176458 A1 May 30, 2024

Related U.S. Application Data

(60) Division of application No. 17/893,587, filed on Aug. 23, 2022, now Pat. No. 11,934,622, which is a
(Continued)

(30) Foreign Application Priority Data

Aug. 2, 2021 (KR) .................. 10-2021-0101549

(51) Int. Cl.
*G06F 3/04847* (2022.01)
*G06F 3/0481* (2022.01)

(52) U.S. Cl.
CPC ........ *G06F 3/0481* (2013.01); *G06F 3/04847* (2013.01); *G06F 2203/04803* (2013.01)

(58) Field of Classification Search
None
See application file for complete search history.

(56) References Cited

U.S. PATENT DOCUMENTS

| | | |
|---|---|---|
| 10,289,292 B2 | 5/2019 | Dunn et al. |
| 10,678,412 B2 | 6/2020 | Vranjes et al. |
| 2002/0191028 A1 | 12/2002 | Senechalle et al. |
| 2004/0139169 A1 | 7/2004 | O'Brien et al. |

(Continued)

FOREIGN PATENT DOCUMENTS

| | | |
|---|---|---|
| JP | 2017-68670 | 4/2017 |
| JP | 2017-68671 A | 4/2017 |

(Continued)

OTHER PUBLICATIONS

U.S. Appl. No. 17/893,587, filed Aug. 23, 2022, Jwa et al.
(Continued)

*Primary Examiner* — Rinna Yi
(74) *Attorney, Agent, or Firm* — NIXON & VANDERHYE P.C.

(57) ABSTRACT

According to an example embodiment, a method and device for controlling a screen displayed on a display is provided. The method includes: based on a layout of a split screen displayed on the display, verifying a trigger region in the split screen; based on a first input controlling a handle region of a pop-up window displayed on an upper layer of the split screen, detecting that at least a portion of the trigger region is overlaid with the pop-up window; changing the layout of the split screen based on at least one of a position of the portion of the trigger region overlaid with the pop-up window, a relative position of the handle region and a divider of the layout; and displaying a region in the split screen in which the pop-up window is to be arranged.

7 Claims, 15 Drawing Sheets

Related U.S. Application Data continuation of application No. PCT/KR2022/010011, filed on Jul. 8, 2022.

(56) References Cited

U.S. PATENT DOCUMENTS

| | | | |
|---|---|---|---|
| 2014/0033119 | A1 | 1/2014 | Kim |
| 2015/0046871 | A1 | 2/2015 | Lewis |
| 2016/0034157 | A1 | 2/2016 | Vranjes |
| 2016/0062552 | A1 | 3/2016 | Jeong et al. |
| 2017/0090710 | A1 | 3/2017 | Maekawa |
| 2021/0109653 | A1 | 4/2021 | Choi et al. |
| 2022/0357845 | A1* | 11/2022 | Luo ................ G06F 3/0486 |

FOREIGN PATENT DOCUMENTS

| | | |
|---|---|---|
| JP | 2017-526057 | 9/2017 |
| KR | 10-2014-0106193 A | 9/2014 |
| KR | 10-2017-0058152 | 5/2017 |
| KR | 10-2020-0097320 A | 8/2020 |
| KR | 10-2020-0122945 | 10/2020 |
| KR | 10-2194055 B1 | 12/2020 |
| KR | 10-2210999 | 2/2021 |
| KR | 10-2021-0044025 | 4/2021 |
| WO | 2016/018794 | 2/2016 |

OTHER PUBLICATIONS

PCT International Search Report dated Oct. 6, 2022 for PCT/KR2022/010011.

Office Action for JP Application No. 2022-578926 issued Oct. 31, 2023 and English translation, 4 pages.

Extended European Search Report for EP Application No. 22853283.4 dated Apr. 12, 2024, 10 pages.

* cited by examiner

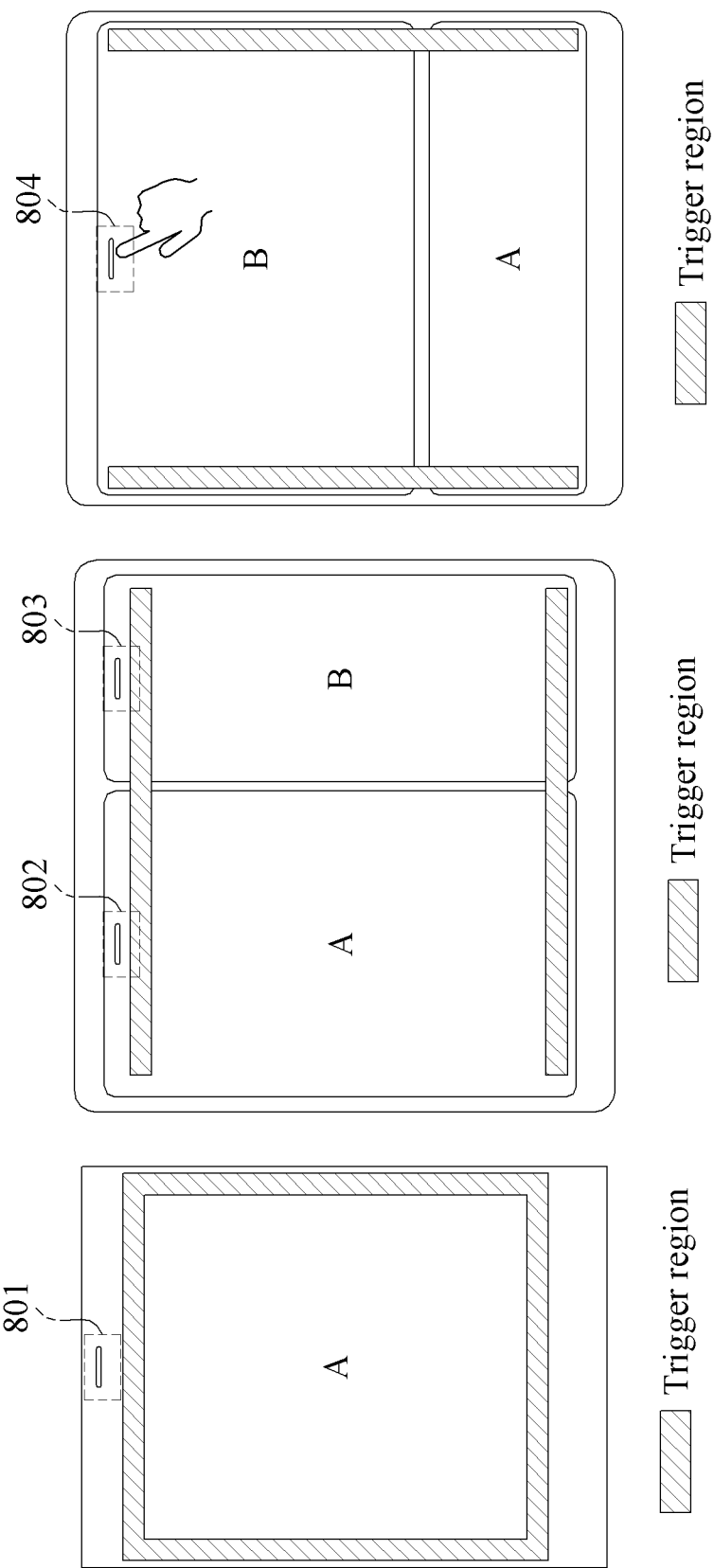

SPLIT SCREEN LAYOUT CONTROL

CROSS-REFERENCE TO RELATED APPLICATIONS

This application is a divisional of U.S. application Ser. No. 17/893,587, filed on Aug. 23, 2022, which is a continuation of International Application No. PCT/KR2022/010011 designating the United States, filed on Jul. 8, 2022, in the Korean Intellectual Property Receiving Office and claiming priority to Korean Patent Application No. 10-2021-0101549 filed on Aug. 2, 2021, in the Korean Intellectual Property Office, the disclosures of each of which are incorporated by reference herein in their entireties.

BACKGROUND

1. Field

The disclosure relates to a method and device for controlling a screen displayed on a display.

2. Description of Related Art

Recently released electronic devices may provide a function of displaying two or more programs or application execution screens on a single display. For example, to display two or more application execution screens, an electronic device may split a display into two or more regions and display the application execution screens on the regions, or overlay a plurality of windows representing the application execution screens and display the overlaid windows.

SUMMARY

Embodiments of the disclosure provide a method of controlling a multi-window screen displaying one or more application execution windows on a display of an electronic device.

Embodiments of the disclosure provide a method of controlling a layout of a screen including one or more application execution windows based on an input from a user.

However, technical aspects of the present disclosure are not limited to the foregoing aspects, and other technical aspects may also be present.

According to an example embodiment, a method of controlling a screen displayed on a display of an electronic device is provided. The method includes: based on a layout of a split screen displayed on the display, verifying a trigger region in the split screen; based on a first input controlling a handle region of a pop-up window displayed on an upper layer of the split screen, detecting that at least a portion of the trigger region is overlaid with the pop-up window; changing the layout of the split screen based on at least one of a position of the portion of the trigger region overlaid with the pop-up window and a relative position of the handle region and a divider of the layout; and displaying a region in the split screen in which the pop-up window is to be arranged based on the changed layout of the split screen.

According to an example embodiment, a method of controlling a screen displayed on a display of an electronic device is provided. The method includes: verifying a trigger region in a screen including an execution window of a first application run by the electronic device; based on a first input controlling a position of a pop-up window displayed on an upper layer of the screen, detecting that at least a portion of the trigger region is overlaid with the pop-up window; splitting the screen including the execution window of the first application based on the position of the overlaid portion of the trigger region; and displaying a region in the split screen in which the pop-up window is to be arranged.

According to an example embodiment, an electronic device is provided, the electronic device including: a display configured to output a screen, and a processor operatively connected to the display and configured to control the screen displayed on the display. The processor may be configured to: verify a trigger region in a split screen based on a layout of the split screen displayed on the display, detect that at least a portion of the trigger region is overlaid with a pop-up window based on a first input controlling a handle region of the pop-up window displayed on an upper layer of the split screen, change the layout of the split screen based on at least one of a position of the portion of the trigger region overlaid with the pop-up window and a relative position of the handle region and a divider of the layout, and display a region in the split screen in which the pop-up window is to be arranged based on the changed layout of the split screen.

According to an example embodiment, an electronic device is provided, the electronic device including a display configured to output a screen, and a processor operatively connected to the display and configured to control the screen displayed on the display. The processor may be configured to: verify a trigger region in the screen including an execution window of a first application being run, detect that at least a portion of the trigger region is overlaid with a pop-up window based on a first input controlling a position of the pop-up window displayed on an upper layer of the screen, split the screen including the execution window of the first application based on the position of the overlaid portion of the trigger region, and display a region in the split screen in which the pop-up window is to be arranged.

According to various example embodiments, a user may control an electronic device to allow a plurality of application execution windows to be displayed on a single display, and readily change an arrangement of the application execution windows displayed on the display of the electronic device.

Other features and aspects will be apparent from the following detailed description, the drawings, and the claims.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIGS. 8A, 8B and 8C are diagrams illustrating examples of setting a trigger region according to various embodiments;

DETAILED DESCRIPTION

Figure 1:
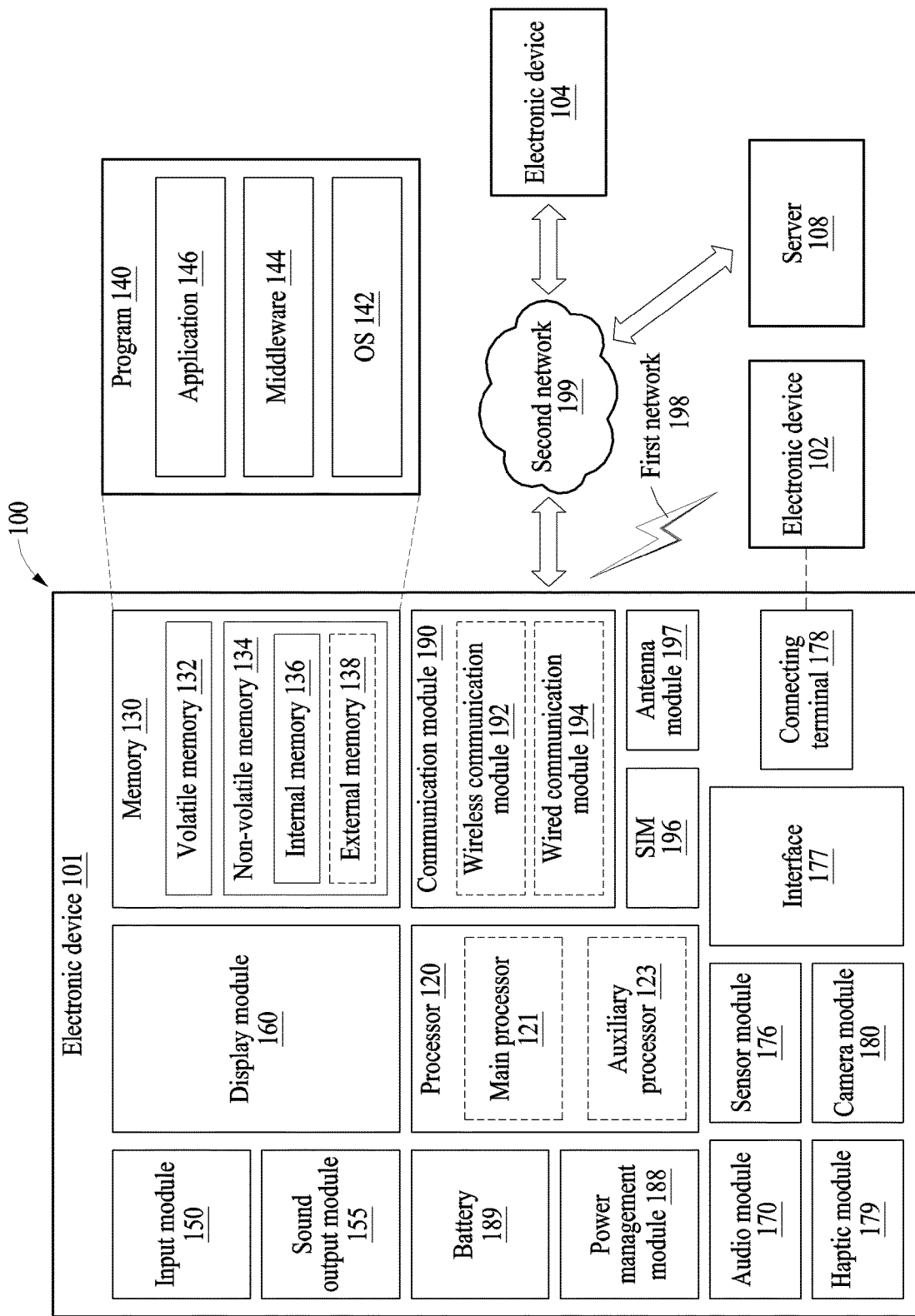
FIG. 1 is a block diagram illustrating an example electronic device in a network environment according to various embodiments.

Hereinafter, various example embodiments will be described in greater detail with reference to the accompanying drawings. When describing the example embodiments with reference to the accompanying drawings, like reference numerals refer to like elements and a repeated description related thereto may not be provided.

FIG. 1 is a block diagram illustrating an example electronic device in a network environment according to various embodiments.

Referring to FIG. 1, an electronic device 101 in a network environment 100 may communicate with an electronic device 102 via a first network 198 (e.g., a short-range wireless communication network), or communicate with at least one of an electronic device 104 and a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In various example embodiments, at least one (e.g., the connecting terminal 178) of the above components may be omitted from the electronic device 101, or one or more other components may be added in the electronic device 101. In various example embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with, the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence (AI) model processing. An AI model may be generated by machine learning. Such learning may be performed by, for example, the electronic device 101 in which the AI model is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may alternatively or additionally include a software structure other than the hardware structure.

The memory 130 may store various data used by at least one component (e.g., the processor 120 or the sensor module 176) of the electronic device 101. The data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing records. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector, and a control circuitry to control a corresponding one of the display, the hologram device, and the projector. According to an example embodiment, the display module 160 may include a touch sensor adapted to sense a touch, or a pressure sensor adapted to measure an intensity of a force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with an external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and an external electronic device (e.g., the electronic device 102, the electronic device 104, or the server 108) and performing communication via the established communication channel. The communication module 190 may include one or more communication processors that are operable independently of the processor 120 (e.g., an AP) and that support direct (e.g., wired) communication or wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beamforming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated high-frequency band (e.g., the mmWave band), and a plurality of antennas (e.g., array antennas) disposed on a second surface (e.g., a top or a side surface) of the PCB or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general-purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an example embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least a part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least a part of a reply to the request. To that end, a cloud computing, distributed computing, mobile edge computing (MEC), or client-server computing technology may be used, for example. The electronic device 101 may provide ultra-low latency services using, e.g., distributed computing or mobile edge computing. In an example embodiment, the external electronic device 104 may include an Internet-of-things (IOT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology. The external electronic device 104 will be referred to hereinafter as an "external device" and an IoT device will be mainly described as an example of the external device.

Figure 2:
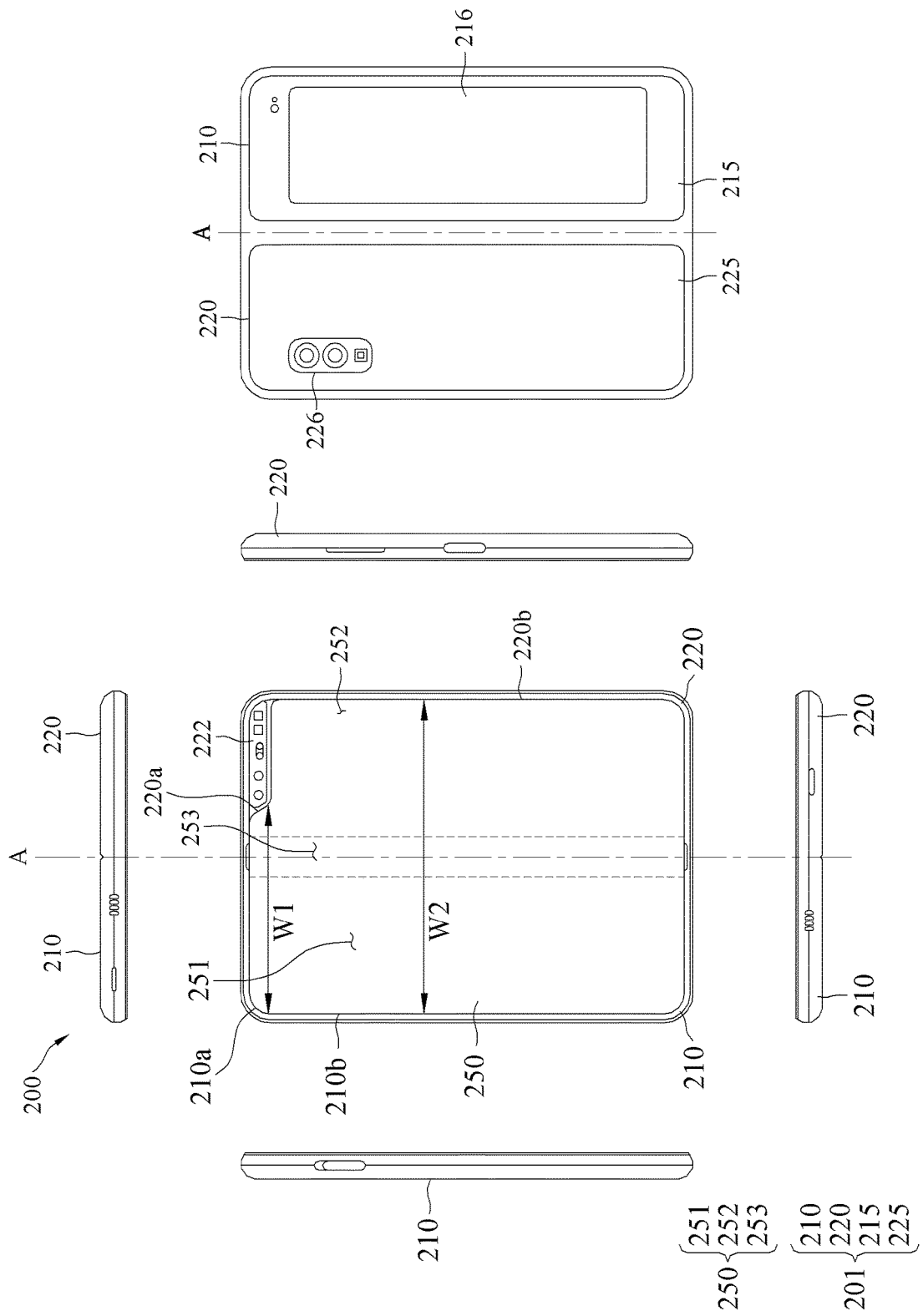
FIG. 2 is a diagram illustrating a foldable electronic device in an unfolded state according to various embodiments.
Figure 3:
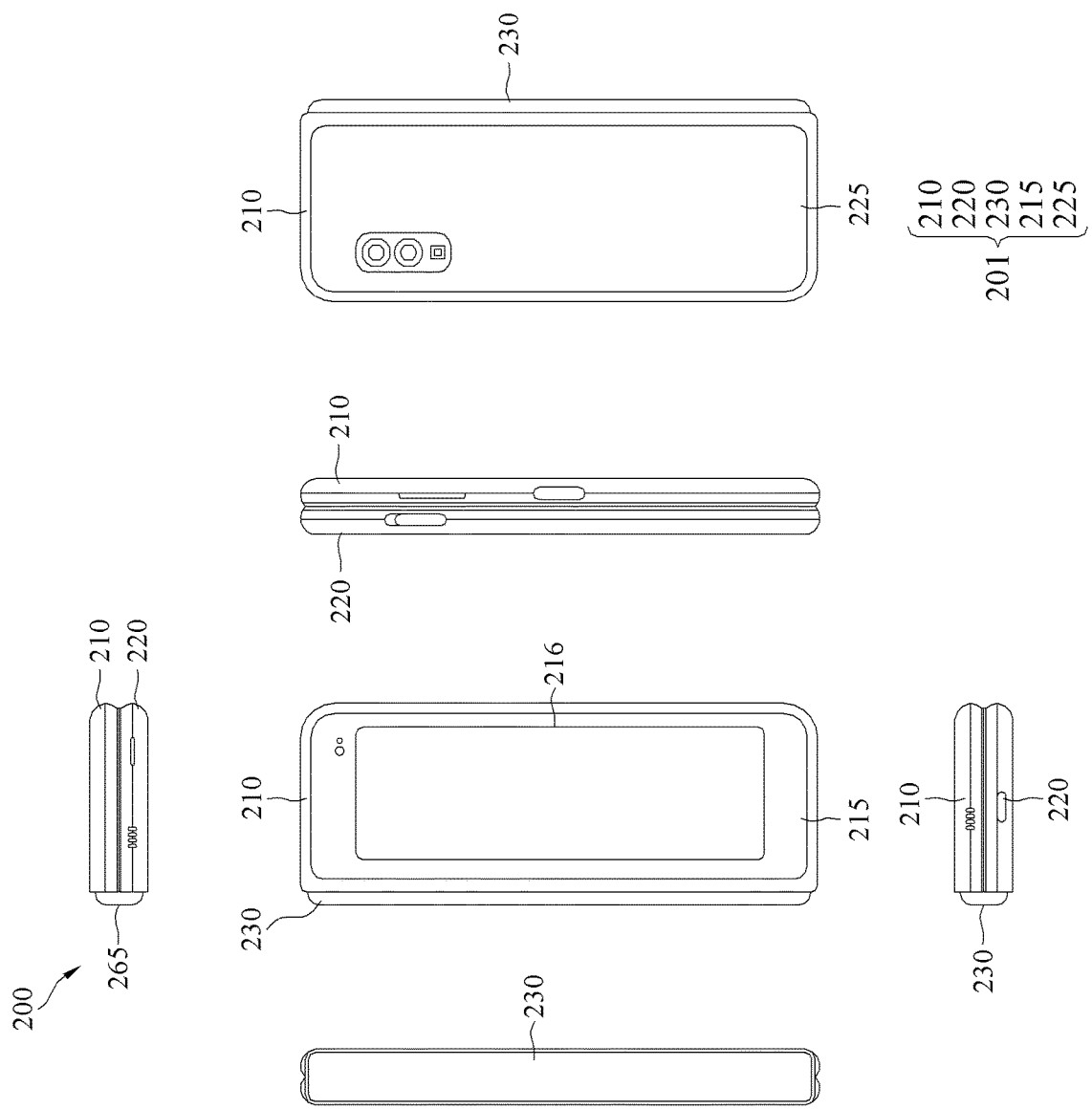
FIG. 3 is a diagram illustrating a foldable electronic device in a folded state according to various embodiments.
Figure 4A:
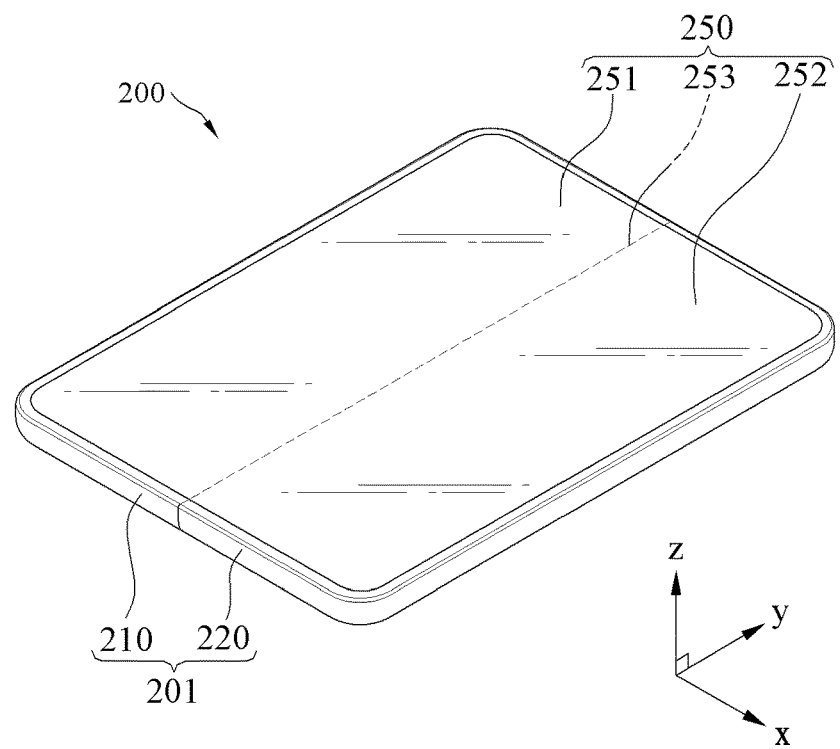
FIGS. 4A and 4B are perspective views of a foldable electronic device in a fully unfolded state and a partially unfolded state (or an intermediate state) according to various embodiments.
Figure 4B:
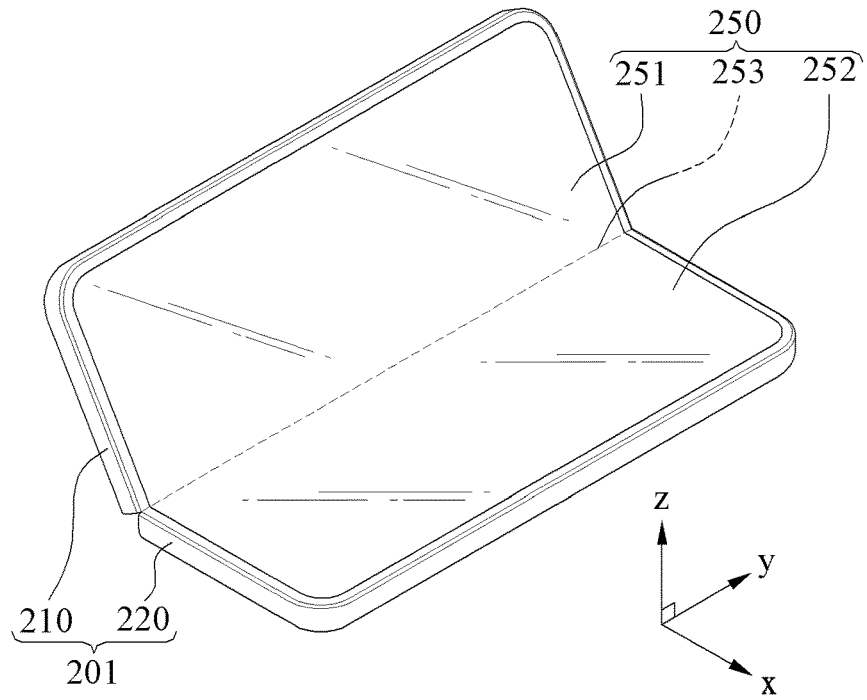

FIG. 2 is a diagram illustrating a foldable electronic device in an unfolded state according to various embodiments. FIG. 3 is a diagram illustrating a foldable electronic device in a folded state according to various embodiments. FIGS. 4A and 4B are perspective views of a foldable electronic device in a fully unfolded state and a partially unfolded state (or an intermediate state) according to various embodiments.

Referring to FIGS. 2, 3, and 4A and 4B, an electronic device 200, which is provided as an example of the electronic device 101 of FIG. 1, may be a foldable or bendable electronic device.

In FIGS. 4A and 4B, and other following drawings, illustrated is a spatial coordinate system defined by an X axis, a Y axis, and a Z axis that are orthogonal to each other. The X axis indicates a width direction of an electronic device, the Y axis indicates a longitudinal direction of the electronic device, and the Z axis indicates a height (or thickness) direction of the electronic device. In the following description, a first direction may indicate a direction parallel to the Z axis.

Referring to FIGS. 2 and 3, according to an example embodiment, the electronic device 200 may include a foldable housing 201, and a flexible or foldable display 250 (hereinafter simply referred to as the "display" 250) (e.g., the display module 160 of FIG. 1) disposed in a space formed by the foldable housing 201. A surface on which the display 250 is disposed (or a surface on which the display 250 is viewed from the outside of the electronic device 200) may be defined as a front surface of the electronic device 200. In addition, a surface opposite to the front surface may be defined as a rear surface of the electronic device 200. In addition, a surface surrounding a space between the front surface and the rear surface may be defined as a side surface of the electronic device 200.

The foldable housing 201 may include a first housing structure 210, a second housing structure 220 including a sensor area 222, a first rear surface cover 215, a second rear surface cover 225, and a hinge structure 230. The hinge structure 230 may include a hinge cover that covers a foldable portion of the foldable housing 201. However, the foldable housing 201 of the electronic device 200 is not limited to the shape and connection illustrated in FIGS. 2 and 3, but may be implemented to have another shape or through a combination and/or connection of components or parts. For example, the first housing structure 210 and the first rear surface cover 215 may be integrated, and the second housing structure 220 and the second rear surface cover 225 may be integrated.

The first housing structure 210 may be connected to the hinge structure 230 and may include a first surface facing a first direction and a second surface facing a second direction opposite to the first direction. The second housing structure 220 may be connected to the hinge structure 230 and may include a third surface facing a third direction and a fourth surface facing a fourth direction opposite to the third direction. The second housing structure 220 may rotate with respect to the first housing structure 210 about the hinge structure 230. A state of the electronic device 200 may be changed to a folded state or an unfolded state.

The first surface and the third surface may meet when the electronic device 200 is in a fully folded state (e.g., a state in which the electronic device 200 is fully folded), and the third direction and the first direction are the same when the electronic device 200 is in a fully unfolded state (e.g., a state in which the electronic device 200 is fully unfolded).

The first housing structure 210 and the second housing structure 220 may be disposed on both sides with respect to a folding axis A, and may be overall symmetrical with respect to the folding axis A. As to be described later, an angle or distance between the first housing structure 210 and the second housing structure 220 may vary according to whether the state of the electronic device 200 is the unfolded state, the folded state, or a partially unfolded or folded state (or an intermediate state). Unlike the first housing structure 210, the second housing structure 220 may additionally include the sensor area 222 in which various sensors are disposed. However, apart from such an area, the first housing structure 210 and the second housing structure 220 may be symmetrical in other areas.

As illustrated in FIG. 2, the first housing structure 210 and the second housing structure 220 may together form a recess that accommodates therein the display 250. Due to the sensor area 222, the recess may have at least two different widths in a direction perpendicular to the folding axis A. For example, the recess may have a first width W1 between a first portion 210a of the first housing structure 210 parallel to the folding axis A and a first portion 220a of the second housing structure 220 formed on a periphery of the sensor area 222, and a second width W2 formed by a second portion 210b of the first housing structure 210 and a second portion 220b of the second housing structure 220 that is not the sensor area 222 and is parallel to the folding axis A. In this example, the second width W2 may be greater than the first width W1. The first portion 220a and the second portion 220b of the second housing structure 220 may be at different distances from the folding axis A. However, the width of the recess is not limited to the example widths. For example, the recess may have a plurality of widths according to the shape of the sensor area 222 or an asymmetrical portion of the first housing structure 210 and the second housing structure 220. The sensor area 222 may be formed to have a predetermined area adjacent to one corner of the second housing structure 220. However, the arrangement, shape, and size of the sensor area 222 are not limited to the illustrated example. For another example, the sensor area 222 may be provided at another corner of the second housing structure 220 or in an area between an upper corner and a lower corner. Components embedded in the electronic device 200 to perform various functions may be exposed to the front surface of the electronic device 200 through the sensor area 222 or through one or more openings provided in the sensor area 222. The components may include various types of sensors. The sensors may include, for example, at least one of a front camera, a receiver, or a proximity sensor. According to other example embodiments, the sensor area 222 may not be included in the second housing structure 220 or may be formed at a position different from the illustrated position.

At least a portion of the first housing structure 210 and the second housing structure 220 may be formed of a metal material or non-metal material having rigidity of a selected magnitude to support the display 250. The portion formed of the metal material may provide a ground plane for the electronic device 200, and may be electrically connected to a ground line formed on a printed circuit board (PCB) disposed inside the foldable housing 201.

The first rear surface cover 215 may be disposed on one side of the folding axis A on the rear surface of the electronic device 200, and may have, for example, a substantially rectangular periphery that is surrounded by the first housing structure 210. Similarly, the second rear surface cover 225 may be disposed on the other side of the folding axis A on the rear surface of the electronic device 200, and may have a periphery that is surrounded by the second housing structure 220.

The first rear surface cover 215 and the second rear surface cover 225 may be substantially symmetrical with respect to the folding axis A. However, the first rear surface cover 215 and the second rear surface cover 225 are not necessarily symmetrical, but the electronic device 200 may include a first rear surface cover and a second rear surface cover of various shapes. According to another example embodiment, the first rear surface cover 215 may be integrated with the first housing structure 210, and the second rear surface cover 225 may be integrated with the second housing structure 220.

The first rear surface cover 215, the second rear surface cover 225, the first housing structure 210, and the second housing structure 220 may form a space in which various components (e.g., a PCB or a battery) of the electronic device 200 are disposed. According to an example embodiment, one or more components may be disposed or visually exposed on the rear surface of the electronic device 200. For example, at least a portion of a sub-display may be visually exposed (e.g., visible) through a first rear area 216 of the first rear surface cover 215. According to another example embodiment, one or more components or sensors may be visually exposed through a second rear area 226 of the second rear surface cover 225. The sensors may include a proximity sensor and/or a rear camera.

A front camera exposed to the front surface of the electronic device 200 through one or more openings provided in the sensor area 222 or a rear camera exposed through the second rear area 226 of the second rear surface cover 225 may include one or more lenses, an image sensor, and/or an image signal processor (ISP). A flash may include, for example, a light-emitting diode (LED) or a xenon lamp. According to some example embodiments, two or more lenses (infrared (IR) camera, and wide-angle and telephoto lenses) and image sensors may be disposed on one surface of the electronic device 100.

Referring to FIG. 3, the hinge cover may be disposed between the first housing structure 210 and the second housing structure 220 to cover internal components (e.g., the hinge structure 230). The hinge structure 230 may be covered by a portion of the first housing structure 210 and the second housing structure 220, or may be exposed to the outside, according to the state of the electronic device 200 (e.g., the unfolded state, the intermediate state, or the folded state).

For example, when the electronic device 200 is in the unfolded state (e.g., the fully unfolded state) as illustrated in FIG. 2, the hinge structure 230 may be covered by the first housing structure 210 and the second housing structure 220 not to be exposed. For another example, when the electronic device 200 is in the folded state (e.g., the fully folded state) as illustrated in FIG. 3, the hinge structure 230 may be exposed to the outside, being between the first housing structure 210 and the second housing structure 220. For still another example, when the electronic device 200 is in the intermediate state with a certain angle formed between the first housing structure 210 and the second housing structure 220, the hinge structure 230 may be partially exposed to the outside, being between the first housing structure 210 and the second housing structure 220. In this example, an exposed area may be smaller than an area exposed in the fully folded state. The hinge structure 230 may include a curved surface.

The display 250 may be disposed in a space formed by the foldable housing 201. For example, the display 250 may be seated on the recess formed by the foldable housing 201 and be viewed from the outside through the front surface of the electronic device 200. For example, the display 250 may form a most portion of the front surface of the electronic device 200. Accordingly, the front surface of the electronic device 200 may include the display 250, and a partial area of the first housing structure 210 and a partial area of the second housing structure 220 that are adjacent to the display 250. In addition, the rear surface of the electronic device 200 may include the first rear surface cover 215, a partial area of the first housing structure 210 adjacent to the first rear surface cover 215, the second rear surface cover 225, and a partial area of the second housing structure 220 adjacent to the second rear surface cover 225.

The display 250 may be a display of which at least one area is deformable into a planar surface or a curved surface. The display 250 may include a folding area 253, a first area 251 disposed on one side of the folding area 253 (e.g., on the left side of the folding area 253 in FIG. 2), and a second area 252 disposed on the other side of the folding area 253 (e.g., on the right side of the folding area 253 in FIG. 2).

However, such an area division of the display 250 as illustrated in FIG. 2 is provided merely as an example, and the display 250 may be divided into a plurality of areas (e.g., two areas or four or more areas) according to a structure or functions thereof. For example, as illustrated in FIG. 2, the display 250 may be divided into areas based on the folding area 203 extending in parallel to the folding axis A. For another example, the display 250 may be divided into areas based on another folding axis (e.g., a folding axis parallel to the width direction of the electronic device 200).

The display 250 may be combined with or disposed adjacent to a touch panel including a touch sensing circuit and a pressure sensor configured to measure the intensity (or pressure) of a touch. For example, for the touch panel, the display 250 may be coupled to or disposed adjacent to the touch panel for detecting a stylus pen of an electromagnetic resonance (EMR) type.

The first area 251 and the second area 252 may be overall symmetrical with respect to the folding area 253. Unlike the first area 251, the second area 252 may include a notch cut according to the presence of the sensor area 222, but may be symmetrical to the first area 251 in the other areas except for such an area. That is, the first area 251 and the second area 252 may include mutually symmetrical portions and mutually asymmetrical portions.

The first area 251 and the second area 252 may each have an edge thickness different from an edge thickness of the folding area 253. The edge thickness of the folding area 253 may be less than the edge thickness of the first area 251 and the second area 252. For example, when cross-sectionally viewed, the first area 251 and the second area 252 may be asymmetrical in terms of thickness. For example, an edge of the first area 251 may be formed to have a first radius of curvature, and an edge of the second area 252 may be formed to have a second radius of curvature different from the first radius of curvature. For another example, when cross-sectionally viewed, the first area 251 and the second area 252 may be symmetrical in terms of thickness.

Hereinafter, each area of the display 250 and operations of the first housing structure 210 and the second housing structure 220 will be described in relation to the state of the electronic device 200, for example, the folded state, the unfolded state, or the intermediate state.

When the electronic device 200 is in the unfolded state as illustrated in FIG. 2, the first housing structure 210 and the second housing structure 220 may be disposed to face the same direction with an angle of 180° formed therebetween. The surfaces of the first area 251 and the second area 252 of the display 250 may form the angle of 180° and face the same direction (e.g., a direction of the front surface of the electronic device 200). The folding area 253 may form the same plane along with the first area 251 and the second area 252.

When the electronic device 200 is in the folded state as illustrated in FIG. 3, the first housing structure 210 and the second housing structure 220 may be disposed to face each other. The surfaces of the first area 251 and the second area 252 of the display 250 may face each other with a narrow angle (e.g., an angle between 0° and 10°) formed therebetween. In this case, the folding area 253 may be formed to have a curved surface having a predetermined curvature, in at least a portion thereof.

When the electronic device 200 is in the intermediate state, the first housing structure 210 and the second housing structure 220 may be disposed with a certain angle therebetween. The surfaces of the first area 251 and the second area 252 of the display 250 may form an angle that is greater than an angle formed therebetween in the folded state and less than an angle formed therebetween in the unfolded state. In this case, the folding area 253 may be formed to have a curved surface having a predetermined curvature, in at least a portion thereof. The curvature may be less than that formed in the folded state.

FIG. 4A is a perspective view of an electronic device in a fully unfolded state according to various example embodiments, and 4B is a perspective view of an electronic device in a partially unfolded state (or an intermediate state) according to various example embodiments. As described above, a state of the electronic device 200 may be changed to a folded state or an unfolded state, for example. When viewed in a direction of a folding axis (e.g., an A axis in FIG. 2), the electronic device 200 may be folded in two manners-in-folding allowing the front surface of the electronic device 200 to form an acute angle and out-folding allowing the front surface of the electronic device 200 to form an obtuse angle. That is, the electronic device 200 of a foldable type may be classified into an in-folding type device that is folded through the in-folding and an out-folding type device that is folded through the out-folding. For example, when the electronic device 200 is in a state in which the electronic device 200 is folded through the in-folding, the first surface of the first housing structure 210 and the third surface of the second housing structure 220 may meet (or face) each other. When the electronic device 200 is a fully unfolded state, the first surface of the first housing structure 210 and the third surface of the second housing structure 220 may face the same direction (e.g., a direction parallel to a Z axis).

For example, when the electronic device 200 is in a state in which the electronic device 200 is folded through the out-folding, the second surface of the first housing structure 210 and the fourth surface of the second housing structure 220 may meet (or face) each other.

In addition, although not illustrated, the electronic device 200 may include a plurality of hinge axes (e.g., two parallel hinge axes including the A axis in FIG. 2 and another axis parallel to the A axis). In this case, the electronic device 200 may be folded through multi-folding which is a combination of the in-folding and the out-folding.

An in-folding type described herein may indicate a state in which the display 250 is not visible to the outside in a fully folded state, and an out-folding type described herein may indicate a state in which the display 250 is visible to the outside in the fully folded state. FIG. 4B illustrates the electronic device 200 that is partially unfolded in the process of the in-folding, for example, in an intermediate state.

Although the state in which the electronic device 200 is folded through the in-folding will be mainly described as an example hereinafter, the following description may also be applicable to the state in which the electronic device 200 is folded through the out-folding.

Figure 5:
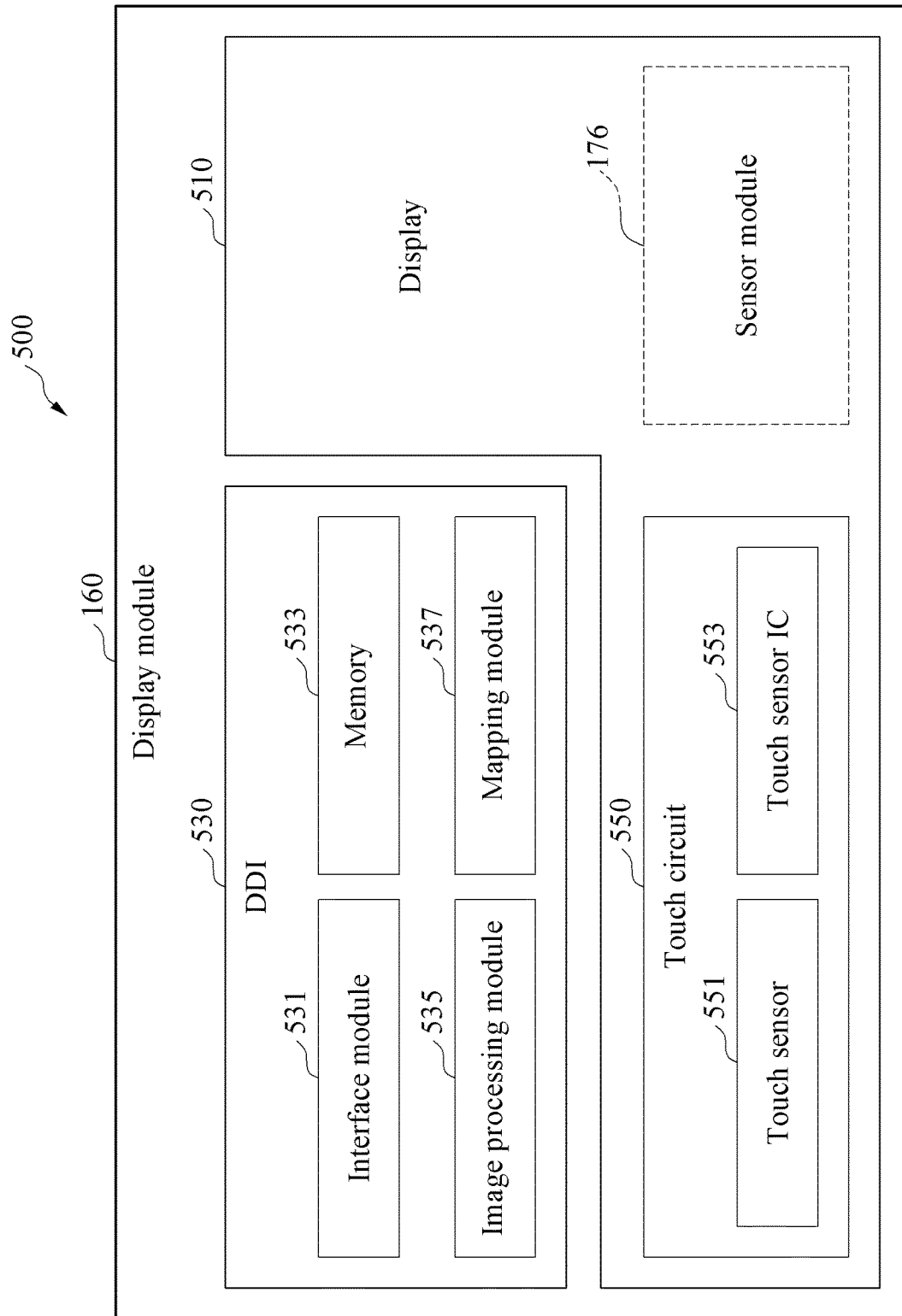
FIG. 5 is a block diagram illustrating an example configuration of a display module according to various embodiments.

FIG. 5 is a block diagram 500 illustrating an example configuration of a display module according to various embodiments.

Referring to FIG. 5, a display module 160 (e.g., the display module 160 of FIG. 1) may include a display 510 (e.g., the display 250 of FIG. 2) and a display driver integrated circuit (IC) (DDI) 530 configured to control the display 510. The DDI 530 may include an interface module (e.g., including interface circuitry) 531, a memory 533 (e.g., a buffer memory), an image processing module (e.g., including various processing circuitry and/or executable program instructions) 535, and/or a mapping module (e.g., including various processing circuitry and/or executable program instructions) 537. For example, the DDI 530 may receive image data or image information including an image control signal corresponding to a command for controlling the image data from another component of an electronic device (e.g., the electronic device 101 of FIG. 1 or the electronic device 200 of FIGS. 2 through 4B) through the interface module 531. For example, the image information may be received from a main processor (e.g., the main processor 121 of FIG. 1 or application processor) or an auxiliary processor (e.g., the auxiliary processor 123 of FIG. 1 or a graphics processing unit (GPU)) operated independently of functions of the main processor. The DDI 530 may communicate with a touch circuit 550 or a sensor module (e.g., including at least one sensor) 176 (e.g., the sensor module 176 of FIG. 1) through the interface module 531. In addition, the DDI 530 may store at least a portion of the received image information in the memory 533 in a frame unit, for example. The image processing module 535 may perform pre-processing or post-processing (e.g., resolution, brightness, or size adjustment) on at least a portion of the image data based on at least one of a characteristic of the image data or a characteristic of the display 510. The mapping module 537 may generate a voltage or current value corresponding to the image data obtained through the pre-processing or the post-processing performed through the image processing module 535. For example, the generation of the voltage or current value may be performed based on at least a portion of characteristics of pixels (e.g., an arrangement (red, green, blue [RGB] stripe or pentile structure) of the pixels, or a size of each sub-pixel) of the display 510. As at least a portion of the pixels of the display 510 is operated based on at least a portion of the voltage or current value, visual information (e.g., text, image, or icon) corresponding to the image data may be displayed through the display 510.

The display module 160 may further include the touch circuit 550. The touch circuit 550 may include a touch sensor 551 and a touch sensor IC 553 configured to control the touch sensor 551. For example, the touch sensor IC 553 may control the touch sensor 551 to sense a touch input or a hovering input at a specific position on the display 510. In this example, the touch sensor IC 553 may sense the touch input or the hovering input by measuring a change in a signal (e.g., voltage, intensity of light, resistance, or quantity of electric charges) at a specific position on the display 510. The touch sensor IC 553 may provide a processor (e.g., the processor 120 of FIG. 1) with information (e.g., position, size, pressure, or time) associated with the sensed touch input or hovering input. At least a portion of the touch circuit 550 (e.g., the touch sensor IC 553) may be included as a portion of the DDI 530 or the display 510, or as a portion of another component (e.g., the auxiliary processor 123) disposed outside the display module 160.

The display module 160 may further include at least one sensor (e.g., a fingerprint sensor, an iris sensor, a pressure sensor, and an illuminance sensor) of the sensor module 176, or a control circuit for the sensor. In this case, the sensor or the control circuit may be embedded in a portion (e.g., the display 510 or the DDI 530) of the display module 160 or a portion of the touch circuit 550. For example, when the sensor module 176 embedded in the display module 160 includes a biosensor (e.g., a fingerprint sensor), the biosensor may obtain bioinformation (e.g., a fingerprint image) associated with a touch input through a partial region of the display 510. For another example, when the sensor module 176 embedded in the display module 160 includes a pressure sensor, the pressure sensor may obtain pressure information associated with a touch input through a partial or entire region of the display 510. The touch sensor 551 or the sensor module 176 may be arranged between pixels of a pixel layer of the display 510, or on or under the pixel layer.

Figure 6:
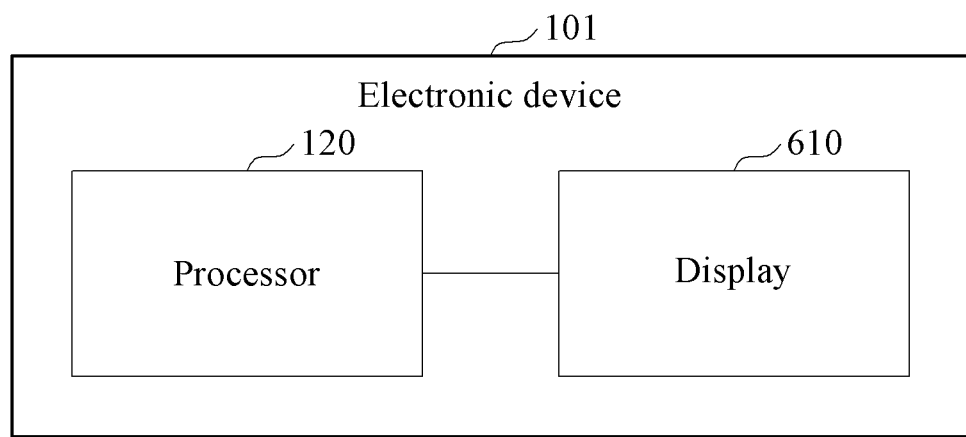
FIG. 6 is a block diagram illustrating an example configuration of an electronic device performing screen control according to various embodiments.

FIG. 6 is a diagram illustrating an example configuration of an electronic device performing screen control according to various embodiments.

Referring to FIG. 6, an electronic device 101 (e.g., the electronic device 101 of FIG. 1 or the electronic device 200 of FIGS. 2 through 4B) may include a display 610 (e.g., the display module 160 of FIG. 1, the display 250 of FIG. 2, the display 250 of FIGS. 4A and 4B, or the display 160 of FIG. 5) and a processor (e.g., including processing circuitry) 120 (e.g., the processor 120 of FIG. 1). The display 610 may output a screen, and the processor 120 may be operatively connected to the display 610 and control the screen displayed on the display 610.

The screen displayed on the display 610 of the electronic device 10 may include one or more windows. A window described herein may refer to a certain region onto which information associated with the execution of functions of the electronic device 101 is output. The information may include various screen elements associated with the execution of functions. The information may include, for example, at least one of a text, a still image or moving image (or video), an icon, a virtual key button, a slide bar, a progress bar, a list item, a thumbnail item, and other various items.

The windows may include an execution window of a program (e.g., the program 140 of FIG. 1) run by the electronic device 101 or an application (or app) (e.g., the application 146 of FIG. 1). The execution window of an app may correspond to a predetermined region of the display 610 displaying a screen output as the app is executed on the electronic device 101. Hereinafter, an execution window of an app will be described as an example of a window included in a screen displayed on the display 610.

The processor 120 of the electronic device 101 may support a multi-window function that displays execution windows of one or more apps through the display 610. The multi-window function may be implemented using a pop-up window and/or split window, for example.

Figure 7A:
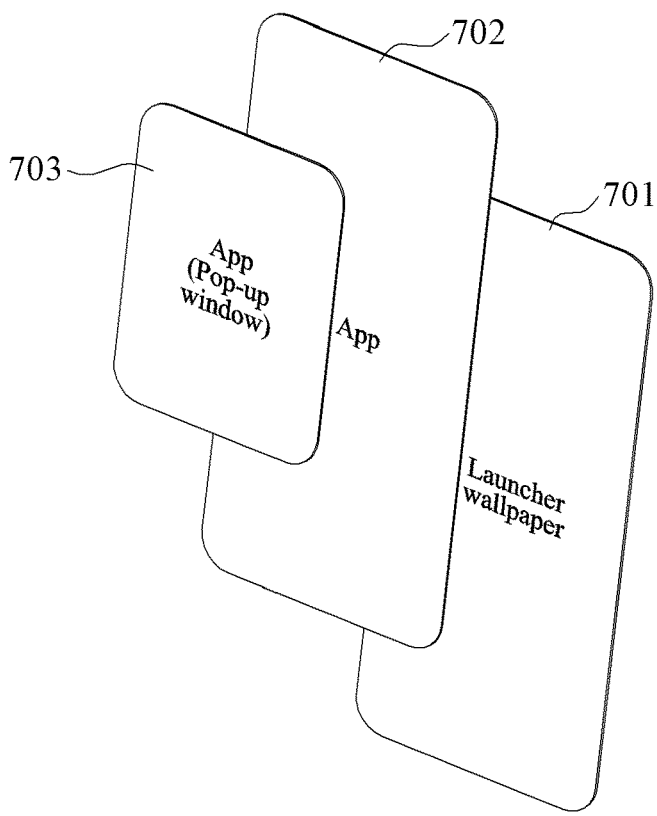
FIGS. 7A and 7B are diagrams illustrating examples of a multi-window according to various embodiments.

The pop-up window may correspond to an execution window of another app (e.g., a second app) overlaid on a homescreen or a screen including an execution window of a specific app (e.g., a first app). For example, as illustrated in FIG. 7A, a first screen 702 including an execution window of a first app may be displayed on an upper layer of a homescreen 701. The execution window of the first app may be displayed in the form of a full screen on the first screen 702. An execution window of a second app may be displayed as a pop-up window 703 on an upper layer of the first screen 702.

Figure 7B:
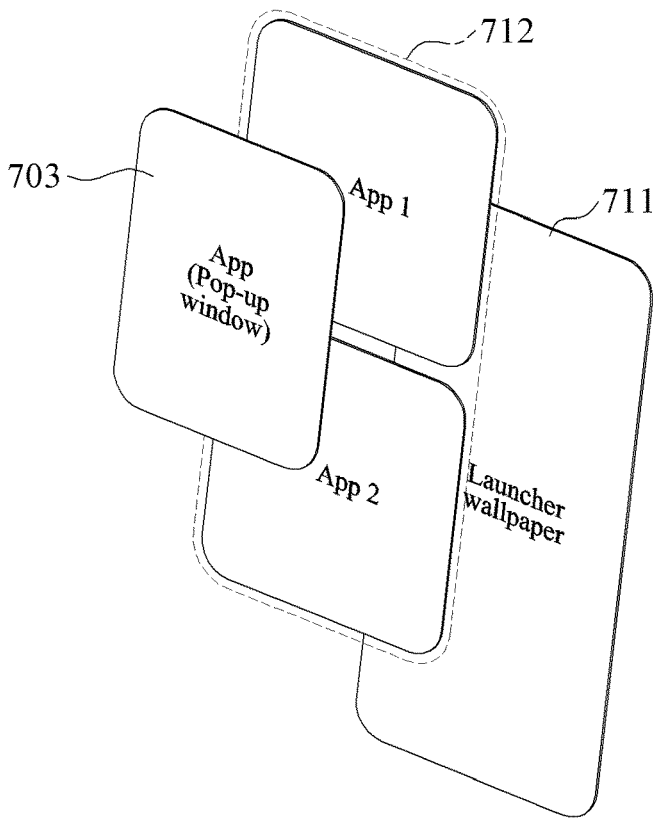

The split window may correspond to an execution window of an app displayed on a partial region in a screen generated through screen splitting. The screen generated through screen splitting, or a split screen, may include a plurality of split windows, and the split windows may be arranged in the screen based on a layout of the split screen. The split windows included in the split screen may have the same layer level. For example, as illustrated in FIG. 7B, a split screen 712 including two split windows may be displayed on an upper layer of a homescreen 711. An execution window of a first app and an execution window of a second app may be displayed in the form of split windows in respective regions of the split screen 712.

Referring back to FIG. 6, the processor 120 may verify a trigger region in a screen (e.g., a first screen including a window of a first app or a split screen including execution windows of apps) displayed on the display 610. The trigger region may be a region preset in the screen to determine whether to readjust a layout of the screen. For example, a partial region at an upper end of the screen, at a lower end of the screen, on a left side of the screen, and/or on a right side of the screen may be defined as the trigger region. In addition, whether to readjust the layout of the screen may be determined using a trigger line in lieu of the trigger region. For example, the electronic device 101 may define and use, as the trigger line, a single boundary line or at least two boundary lines of the trigger region. In this example, the definition or functions of the trigger region may be replaced with those of the trigger line. Although the trigger region for screen splitting will be mainly described hereinafter for the convenience of description, examples are not limited thereto, and operations and functions according to the following description may also be implemented based on the trigger line.

The trigger region may be verified (or determined) based on the layout of the screen. For example, the trigger region may be verified based on whether the screen is a split screen and/or on a splitting direction of the screen. For example, as illustrated in FIG. 8A, when the screen is not a split screen but a screen including an execution window of a single app, the trigger region may be defined by a partial region at an upper end, at a lower end, on a left side, and on a right side of the screen. For example, as illustrated in FIG. 8B, when the screen is a split screen including a plurality of windows and a splitting direction is a left-right direction, the trigger region may be defined by a partial region at an upper end and at a lower end of the screen. For example, as illustrated in FIG. 8C, when the screen is a split screen and the splitting direction is a top-bottom direction, the trigger region may be defined by a partial region on a left side and on a right side of the screen. In addition, at least one trigger line which is a boundary of each trigger region may be defined.

Referring back to FIG. 6, a position of a pop-up window may be controlled by an input from a user input through the display 610 or an input device of the electronic device 101. For example, the position of the pop-up window on the screen may be controlled in response to a position at which the pop-up window is dragged by a user input dragging the pop-up window. Hereinafter, a user input controlling a position of a pop-up window will be referred to as a first user input.

The first user input may include an input controlling a handle region of the pop-up window. The handle region may be a partial region in the pop-up window, and correspond to a region related to controlling the pop-up window. For example, the handle region may include a region in the pop-up window that is predetermined for controlling a position of the pop-up window. The predetermined region of the handle region may have a preset size and shape, and a position disposed in the pop-up window. For example, the handle region may be defined as a partial region at an upper end of the pop-up window, and be displayed as a visual representation (or indicator) through a display. In this example, the visual representation may be displayed in various forms: a display region of the visual representation may be displayed on a region of the display substantially the same as the handle region or displayed such that at least a portion thereof is overlapped even though the display region of the visual representation is not matched to the handle region. For example, as illustrated in FIG. 8A, a partial region in a screen may be defined as a handle region 801, and the handle region 801 may be displayed in the form of a bar through a display. The handle region 801 may correspond to a specific line corresponding to a bar displayed on a screen or a specific region including the bar displayed on the screen. For example, as illustrated in FIG. 8B, when a split window including execution windows of apps is displayed on the display, partial regions of the respective execution windows may be defined as handle regions 802 and 803, and the handle regions 802 and 803 may be displayed in the form of bars on the respective execution windows.

For another example, the handle region may be determined based on a region in the pop-up window receiving the first user input. For example, when the first user input touching the pop-up window is received, a partial region (or a point) in the pop-up window receiving such a touch input may be determined to be the handle region (or a handle point). In addition, a center point of the touch input corresponding to the first user input or one point in the partial region receiving the touch input may be used as a handle point to replace the handle region. In addition, although the handle region may have a preset size and shape, a position of the handle region may not be determined until the first user input is received. For example, the position of the handle region may be defined such that the partial region (or point) receiving the touch input corresponding to the first user input touching the pop-up window is disposed at a position (e.g., center) of the handle region having the preset size and shape. In this example, the handle region and the pop-up window may move along a touch position according to a movement of a drag corresponding to the first user input.

For example, referring to FIG. 8C, a specific region receiving a touch input made by a first user input touching the specific region on an execution window B of a first app displayed on a display may be defined as a handle region 804, and a visual representation provided in the form of a bar for displaying a position of the defined handle region 804 may be displayed on the execution window B of the first app. Hereinafter, an example where a handle region is a partial region preset at an upper end of a pop-up window will be described for the convenience of description.

According to an example embodiment, the processor 120 may detect whether at least a portion of the determined trigger region is overlaid with the pop-up window. For example, when at least a portion of a region of a display on which the pop-up window is displayed and at least a portion in the display corresponding to the trigger region are overlapped, the processor 120 may detect that at least a portion of the trigger region is overlaid with the pop-up window. Based on the first user input controlling the position of the pop-up window, the position of the pop-up window may be changed in the screen, and the processor 120 may detect whether at least a portion of the trigger region is overlaid with the pop-up window.

For example, in a switch mode, the processor 120 may detect such an overlay of the trigger region. The switch mode may refer to a mode in which an operation of changing a layout of a screen is performed to arrange a pop-up window, and be executed in response to an input from a user requesting the execution of the switch mode. Such a user input requesting the execution of the switch mode may be predefined as an input that is distinguished from the first user input. For example, an input pushing the handle region of the pop-up window relatively longer may be defined as the input requesting the execution of the switch mode, and the switch mode may be executed when the input pushing the handle region of the pop-up window for long is received.

When detecting that at least a portion of the trigger region is overlaid with the pop-up window, the processor 120 may adjust the layout of the screen based on at least one of a position of the portion of the trigger region overlaid with the pop-up window and a relative position of the handle region and a divider of the layout of the screen. The adjusting of the layout of the screen may include splitting the screen and arranging windows in respective regions of the split screen, and/or determining a window to be downsized among one or more windows included in the screen and determining a downsizing direction of the window.

For example, the processor 120 may split the screen including an execution window of a first app based on the position of the portion of the trigger region overlaid with the pop-up window. The position of the portion of the trigger region overlaid with the pop-up window may refer to a position of this overlaid trigger region on the screen, and indicate whether the overlaid trigger region is disposed at an upper end or at a lower end of the screen, or on a left side or on a right side of the screen. For example, the processor 120 may determine a splitting direction of the screen based on the position of the overlaid trigger region, and split the screen in the determined splitting direction. The processor 120 may split the screen such that the screen includes a plurality of regions, and display a region in which the pop-up window is to be disposed among the regions. The splitting of a screen based on a position of an overlaid trigger region will be described in detail with reference to FIGS. 9 and 10.

According to an example embodiment, the processor 120 may change a layout of the split screen based on the position of the trigger region overlaid with the pop-up window and a relative position of the handle region and a divider of the layout. The layout of the split screen may include the divider which is a reference line that splits the screen. The split screen may include a plurality of regions obtained by splitting the screen by the divider. For example, the processor 120 may determine a downsizing direction of windows included in the split screen based on the position of the overlaid trigger region. For example, the processor 120 may determine at least one window to be downsized among the windows included in the split screen based on the relative position of the handle region and the divider of the layout. The processor 120 may change the layout of the split screen by downsizing, in the determined downsizing direction, the window determined as the window to be downsized, and display a region in the split screen in which the pop-up window is to be arranged based on the changed layout of the split screen. For example, as the window is downsized, a new region may be generated in the split screen, and the new region generated in the split screen may be displayed as the region in which the pop-up window is to be arranged. The adjusting of a layout of a split screen based on at least one of a position of an overlaid trigger region and a relative position of a handle region and a divider of the layout will be described in greater detail below with reference to FIGS. 11A through 14.

According to an example embodiment, based on a second user input determining a position of the pop-up window, the processor 120 may arrange the pop-up window in a region in which the pop-up window is to be arranged on a screen displayed on the display 610 (e.g., a first screen including a window of a first app or a split screen including execution windows of a plurality of apps). For example, when the first user input is an input dragging the pop-up window, the second user input may correspond to an input releasing the pop-up window.

When the pop-up window is arranged on a specific screen, a layer level thereof may be changed to the same layer level as a layer level of the screen on which the pop-up window is arranged. For example, when the pop-up window is arranged on a first screen including a window of a first app, a layer level of an execution window of a second app displayed as the pop-up window may be changed to be the same as a layer level of the execution window of the first app included in the first screen. For another example, when the pop-up window is arranged on a split screen including execution windows of a plurality of apps, a layer level of an execution window of an app displayed as the pop-up window may be changed to be the same as a layer level of the execution windows of the apps included in the split screen.

According to an example embodiment, the electronic device 101 may include the display 610 configured to output a screen and the processor 120 operatively connected to the display 610 and configured to control the screen displayed on the display 610. The processor 120 may verify a trigger region in a screen including an execution window of a first app being run, detect that at least a portion of the trigger region is overlaid with a pop-up window based on a first user input controlling a position of the pop-up window displayed on an upper layer of the screen, split the screen including the execution window of the first app based on a position of the overlaid trigger region, and display a region in the split screen in which the pop-up window is to be arranged.

When splitting the screen, the processor 120 may determine a splitting direction of the screen based on the position of the overlaid trigger region and split the screen based on the determined splitting direction.

According to an example embodiment, the electronic device 101 may include the display 610 configured to output a screen, and the processor 120 operatively connected to the display 610 and configured to control the screen displayed on the display 610. The processor 120 may verify a trigger region in a split screen based on a layout of the split screen displayed on the display 610, detect that at least a portion of the trigger region is overlaid with a pop-up window based on a first user input controlling a handle region of the pop-up window displayed on an upper layer of the split screen, change a layout of the split screen based on at least one of a position of the trigger region overlaid with the pop-up window and a relative position of a handle region and a divider of the layout, and display a region in the split screen in which the pop-up window is to be arranged based on the changed layout of the split screen.

When changing the layout of the split screen, the processor 120 may determine a downsizing direction of windows included in the split screen based on the position of the trigger region overlaid with the pop-up window, and determine at least one window to be downsized among the windows included in the split screen based on the relative position of the handle region and the divider of the layout.

FIGS. 9 through 15B are diagrams illustrating examples of one or more operations of a method of controlling a screen displayed on a display of an electronic device, which is performed by a processor, according to various example embodiments. In the examples of FIGS. 9 through 15B, the electronic device may correspond to the electronic device 101 of FIG. 1, the electronic device 200 of FIG. 2 through 4B, or the electronic device 101 of FIG. 6. In addition, the display may correspond to the display module 160 of FIG. 1, the display 250 of FIG. 2, the display 250 of FIGS. 4A and 4B, the display module 160 of FIG. 5, or the display 610 of FIG. 6. In addition, the processor may correspond to the processor 120 of FIG. 1 or the processor 120 of FIG. 6.

Figure 9:
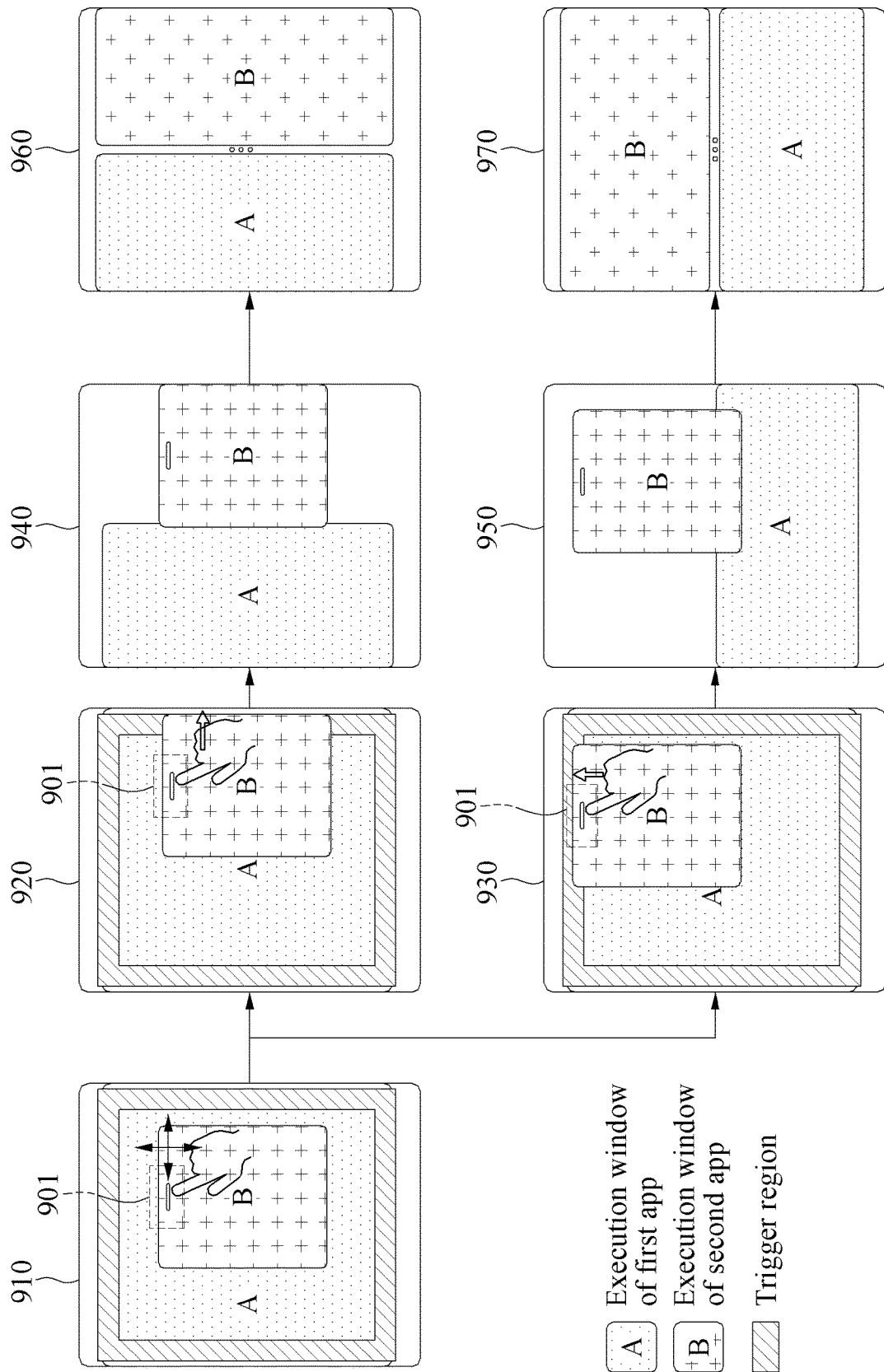
FIG. 9 is a diagram illustrating an example of splitting a screen according to various embodiments.

FIG. 9 is a diagram illustrating an example of splitting a screen according to various embodiments.

Referring to FIG. 9, a screen 910 displayed on the display of the electronic device may include a screen including an execution window of a first app run by the electronic device and a pop-up window displayed on an upper layer of the screen including the execution window of the first app. Hereinafter, the screen including the execution window of the first app will be referred to as a first screen. For example, the execution window of the first app may be displayed as a full screen on the first screen. For example, the pop-up window may correspond to an execution window of a second app. As described above, a partial region of the first screen may be determined to be a trigger region.

As described above, a position of the pop-up window may be changed based on a first user input controlling the position of the pop-up window. For example, the first user input controlling the position of the pop-up window may include a first user input touching and dragging a handle region 901, and the position of the pop-up window in the screen may be changed by the first user input dragging the handle region 901. For example, the position of the pop-up window may be changed as shown on a screen 920 when the handle region 901 is dragged and moved rightward by the first user input, and be changed as shown on a screen 930 when the handle region 901 is dragged and moved upward by the first user input. In this example, when the position of the pop-up window is changed as shown on the screen 920 or the screen 930 based on the first user input, a partial region of the pop-up window may overlap a partial region of the trigger region, and thus the processor may detect that at least a portion of the trigger region is overlaid with the pop-up window.

When the trigger region is overlaid with the pop-up window, the processor may split the first screen. In such a case, a screen splitting direction may be determined based on a position of the overlaid trigger region in the first region. For example, when the position of the overlaid trigger region is on a right side of the first screen as shown on the screen 920, the splitting direction may be determined to be a left-right direction. For another example, when the position of the overlaid trigger region is at an upper end of the first screen as shown on the screen 930, the splitting direction of the first screen may be determined to be a top-bottom direction. Although not illustrated in FIG. 9, when the position of the overlaid trigger region is on a left side of the first screen, the splitting direction of the first screen may be determined to the left-right direction. In addition, when the position of the overlaid trigger region is at a lower end of the first screen, the splitting direction of the first screen may be determined to be the top-bottom direction.

As the first screen is split in the determined splitting direction, the number of regions included in the first screen may increase. When the first screen is split, the execution window of the first app previously included in the first screen may be arranged in a first region which is any one of the regions obtained through the splitting, and a second region different from the first region among the regions may be displayed as a region in which the pop-up window is to be arranged. The region in which the execution window of the first app is to be arranged may be determined based on the position of the trigger region overlaid with the pop-up window.

For example, when the position of the overlaid trigger region is on a right side as shown on a screen 940, the region in which the execution window of the first app is to be arranged may be determined to be a left region among regions obtained through left-right splitting, and a right region may be displayed as the region in which the pop-up window is to be arranged. Although not illustrated in FIG. 9, when the position of the overlaid trigger region is on a left side, the execution window of the first app may be determined to be a right region among the regions obtained through the left-right splitting, and a left region may be displayed as the region in which the pop-up window is to be arranged.

For another example, when the position of the overlaid trigger region is at an upper end as shown on a screen 950, the region in which the execution window of the first app is to be arranged may be determined to be a lower end region among regions obtained through top-bottom splitting, and an upper end region may be displayed as the region in which the pop-up window is to be arranged. Although not illustrated in FIG. 9, when the position of the overlaid trigger region is at a lower end, the execution window of the first app may be determined to be an upper end region among the regions obtained through the top-bottom splitting, and a lower end region may be displayed as the region in which the pop-up window is to be arranged.

When the second user input determining the position of the pop-up window is received, the pop-up window may be arranged in a region in the first screen in which the pop-up window is to be arranged as shown on a screen 960 or a screen 970. For example, the arranging of the pop-up window in the first screen may include arranging, in the first screen, an execution window of the second app displayed as the pop-up window, and deleting the pop-up window.

For example, when the first user input is an input dragging the pop-up window, the second user input may correspond to an input releasing the pop-up window. When the pop-up window is arranged on the first screen, a layer level of the execution window of the second app displayed as the pop-up window may be changed to be the same as a layer level of the execution window of the first app included in the first screen.

Figure 10:
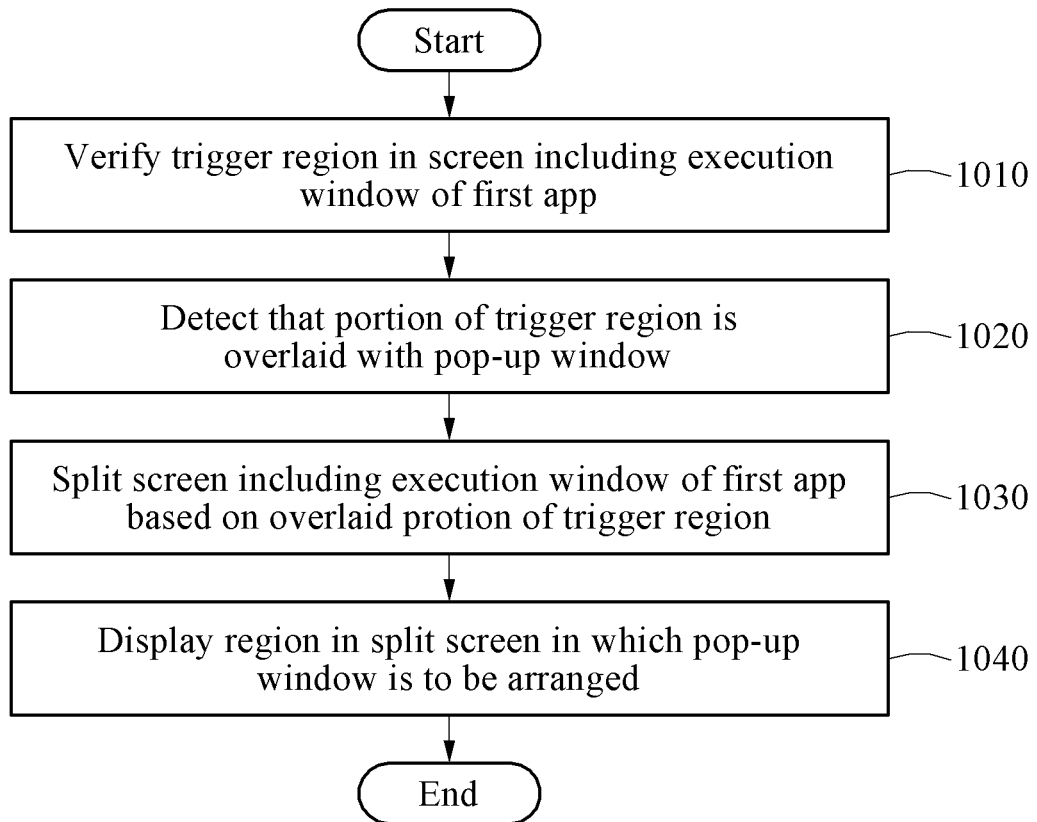
FIG. 10 is a flowchart illustrating an example method of controlling a screen displayed on a display of an electronic device according to various embodiments.

FIG. 10 is a flowchart illustrating an example method of controlling a screen displayed on a display of an electronic device according to various embodiments.

Referring to FIG. 10, a method of controlling a screen displayed on a display of an electronic device may include operation 1010 of verifying a trigger region in the screen including an execution window of a first app run by the electronic device, operation 1020 of detecting that at least a portion of the trigger region is overlaid with a pop-up window based on a first user input controlling a position of the pop-up window displayed on an upper layer of the screen, operation 1030 of splitting the screen including the execution window of the first app based on a position of the overlaid portion of the trigger region, and operation 1040 of displaying a region in the split screen in which the pop-up window is to be arranged.

Operation 1030 of splitting the screen may include determining a splitting direction of the screen based on the position of the overlaid portion of the trigger region, and splitting the screen based on the determined splitting direction.

Operation 1040 of displaying the region in which the pop-up window is to be arranged may include arranging the execution window of the first app in a first region in the split screen based on the position of the overlaid portion of the trigger region, and displaying a second region in the split screen as the region in which the pop-up window is to be arranged.

The screen may include the execution window of the first app run by the electronic device, and the pop-up window may include an execution window of a second app run by the electronic device.

FIGS. 11A, 11B, 11C and 11D (which may be referred to as FIGS. 11A through 11D) are diagrams illustrating examples of determining a downsizing direction of windows included in a split screen according to various embodiments.

Figure 11A:
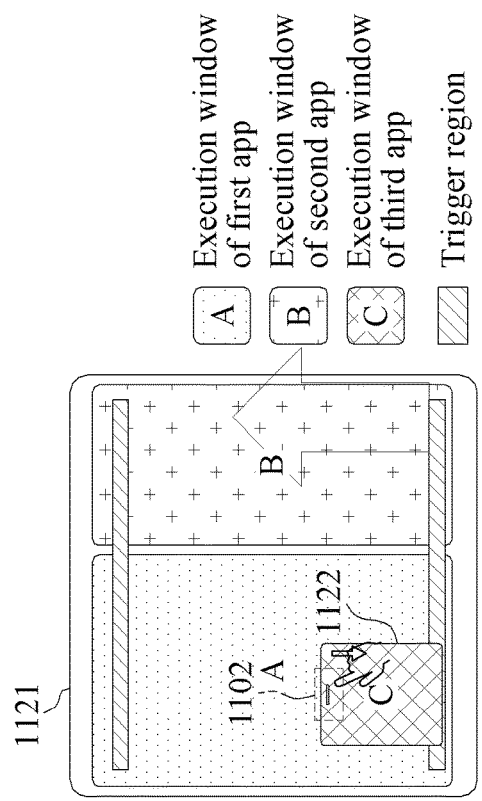
FIGS. 11A, 11B, 11C and 11D are diagrams illustrating examples of determining a downsizing direction of windows included in a split screen according to various embodiments.

Referring to FIG. 11A, a screen 1110 displayed on a display of an electronic device may include a split screen 1111 including an execution window of at least one app and a pop-up window 1112 displayed on an upper layer of the split screen 1111. For example, the split screen 1111 may include an execution window of a first app and an execution window of a second app. For example, the pop-up window 1112 may correspond to an execution window of a third app.

As described above, a position of the pop-up window 1112 may be changed based on a first user input controlling a position of the pop-up window 1112. For example, by the first user input that drags a handle region 1101 upward on the split screen 1111, the position of the pop-up window 1112 may be changed to an upper end of the split screen 1111. A processor (e.g., the processor 120 of FIG. 1 or FIG. 6) of the electronic device may detect whether at least a portion of a trigger region is overlaid with the pop-up window 1112. For example, when at least a portion of the trigger region is overlaid with a pop-up window, the processor may determine a downsizing direction of a window included in a split screen based on a position of the overlaid trigger region. For example, the downsizing direction of the window included in the split screen may be determined to be a direction opposite to the position of the overlaid trigger region in the split screen. For example, when the position of the portion of the trigger region overlaid with the pop-up window 1112 is at an upper end of the split screen 1111 as illustrated, a downsizing direction of a window included in the split screen 1111 may be determined to be a downward direction.

Figure 11B:
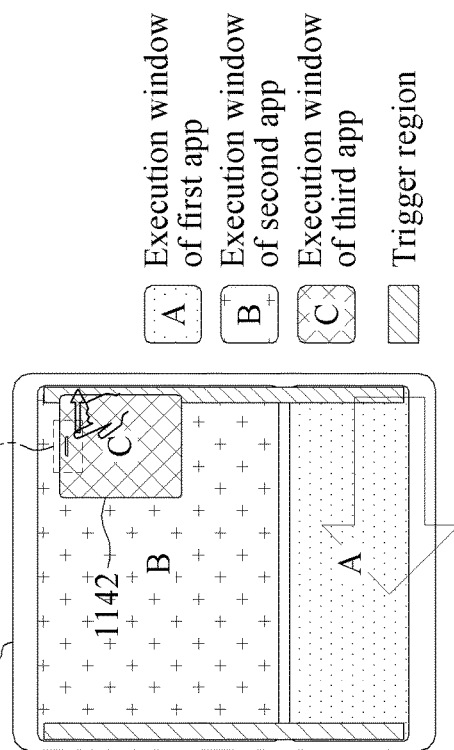

Referring to FIG. 11B, a position of a pop-up window 1122 may be changed to a lower end of a split screen 1121 by a first user input that drags a handle region 1102 downward on the split screen 1121. When a position of a trigger region overlaid with the pop-up window 1122 corresponds to a lower end of the split screen 1121, a downsizing direction of a window included in the split screen 1121 may be determined to be an upward direction.

Figure 11C:
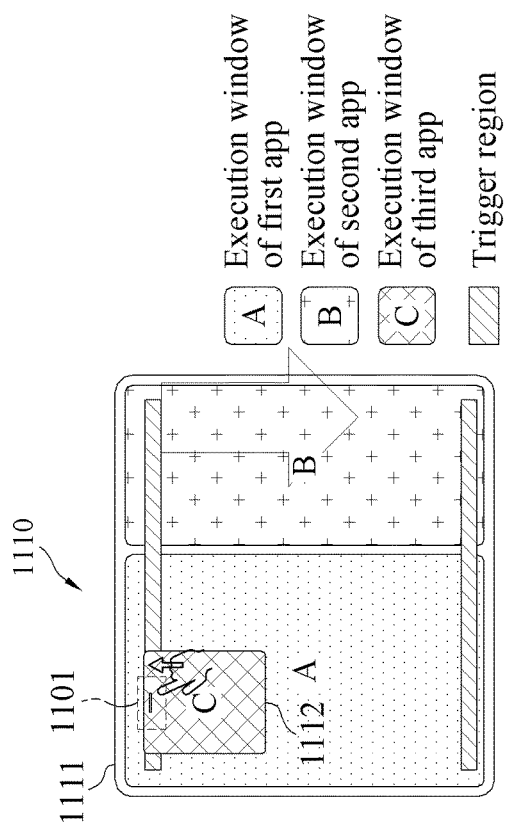

Referring to FIG. 11C, a position of a pop-up window 1132 may be changed to be on a left side of a split screen 1131 by a first user input that drags a handle region 1103 leftward on the split screen 1131. When a position of a trigger region overlaid with the pop-up window 1132 corresponds to the left side of the split screen 1131, a downsizing direction of a window included in the split screen 1131 may be determined to be a right direction.

Figure 11D:
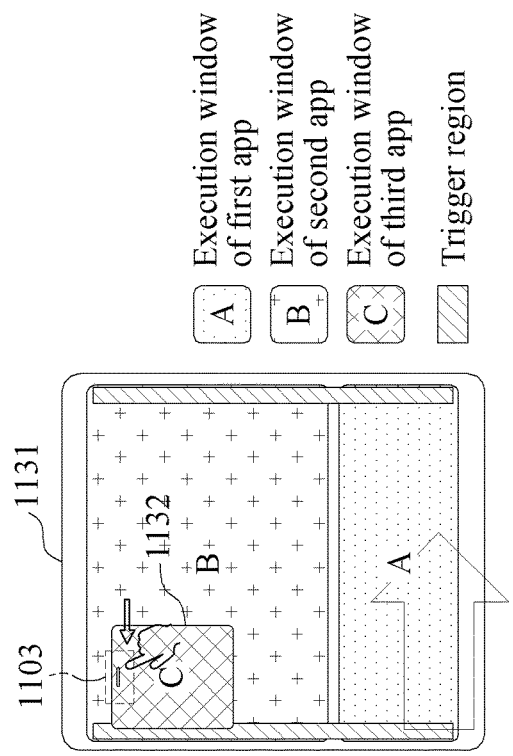

Referring to FIG. 11D, a position of a pop-up window 1142 may be changed to be on a right side of a split screen 1141 by a first user input that drags a handle region 1104 rightward on the split screen 1141. When a position of a trigger region overlaid with the pop-up window 1142 corresponds to the right side of the split screen 1141, a downsizing direction of a window included in the split screen 1141 may be determined to be a left direction.

Figure 12A:
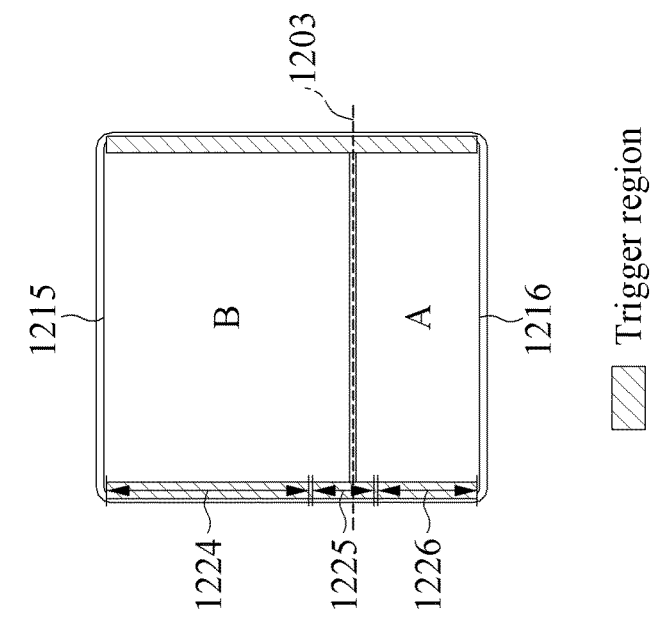
FIGS. 12A, 12B and 12C are diagrams illustrating an example of determining a window to be downsized among windows included in a split screen according to various embodiments.
Figure 12B:
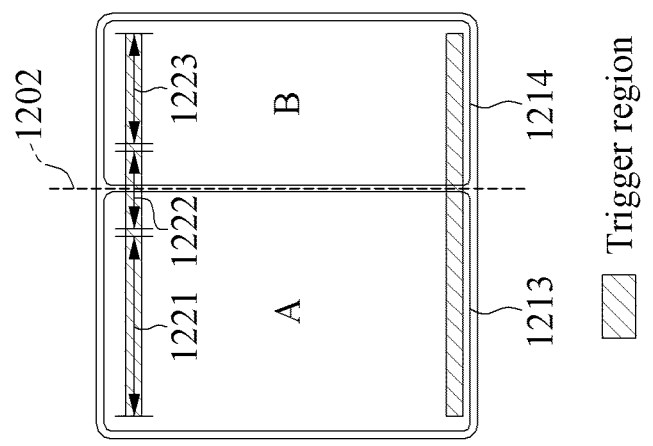
Figure 12C:
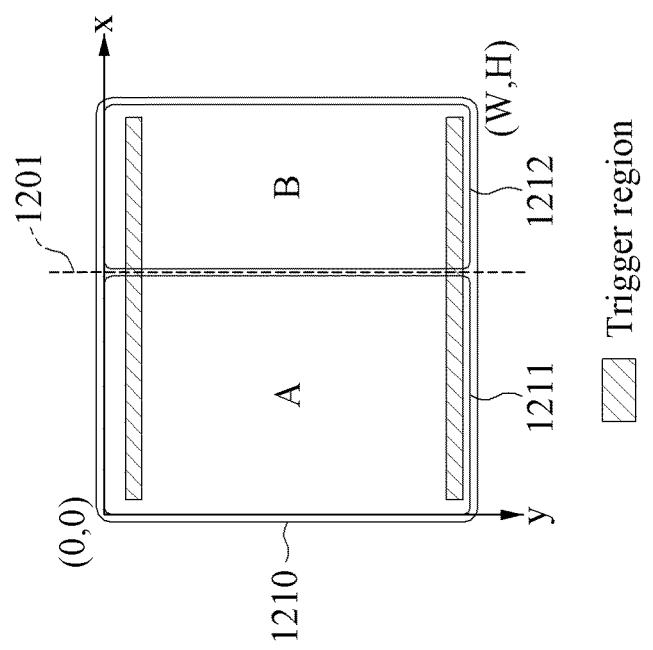

FIGS. 12A, 12B and 12C (which may be referred to as FIGS. 12A through 12C) are diagrams illustrating an example of determining a window to be downsized among windows included in a split screen according to various embodiments.

A divider may refer to a reference line for splitting a screen as described above. For example, a line 1201 illustrated in FIG. 12A, a line 1202 illustrated in FIG. 12B, and a line 1203 illustrated in FIG. 12C may correspond to such a divider of a layout of a split screen.

According to an example embodiment, a window to be downsized among windows included in a split screen may be determined based on a relative position of a handle region and a divider. As described above, the handle region may correspond to a partial region of a pop-up window, which may be a region related to controlling the pop-up window. The handle region may be determined to be a region preset in the pop-up window, and be determined based on a region in the pop-up window receiving a first user input. The relative position between the handle region of the pop-up window and the divider may be determined based on a direction in which the handle region is disposed with respect to the divider and a distance by which the handle region is separate from the divider based on x or y coordinate in the screen. For example, the relative position with respect to the divider may be determined based on a position of a reference point included in the handle region.

For example, referring to FIG. 12A, when a screen 1210 is represented as an xy plane with a left upper end (0, 0) and a right lower end (W, H), a window to be downsized may be determined based on an x coordinate of a handle region with respect to an x coordinate of the divider 1201. In this example, when the x coordinate of the handle region is greater than or equal to 0 and less than a value obtained by subtracting 'a' (e.g., a denotes a preset constant greater than 0) from the x coordinate of the divider 1201 (e.g., x coordinate of the divider 1201—a), a processor may determine a window 1211 to be the window to be downsized. When the x coordinate of the handle region is greater than or equal to the value obtained by subtracting 'a' from the x coordinate of the divider 1201 (e.g., x coordinate of the divider 1201—a) and less than a value obtained by adding 'a' to the x coordinate of the divider 1201 (e.g., x coordinate of the divider 1201+a), the processor may determine a window 1212 to be the window to be downsized. However, in the case of a split screen that is obtained through top-bottom splitting, the processor may determine the window to be downsized by comparing a y coordinate of a divider and a y coordinate of a handle region.

For example, a value of 'a' may be determined as an arbitrary fixed value, or determined based on a width or height of a screen. The value of 'a' may be determined based on a size of a touch region receiving a touch input from a user.

According to an example embodiment, at least one window to be downsized in a split screen may be determined based on whether a position of a handle region is included in a sub-trigger region determined based on a divider of a layout. A trigger region may be divided into sub-trigger regions based on the divider. For example, as illustrated in FIG. 12B, the trigger region may be divided into three sub-trigger regions 1221, 1222, and 1223 based on the divider 1202 that splits a screen left and right. The trigger region may be divided into the sub-trigger region 1222 with a preset length including the divider 1202 at a center thereof, and the sub-trigger regions 1221 and 1223 respectively disposed on a left side and a right side from the divider 1202. When the position of the handle region is included in the sub-trigger region 1221 disposed on the left side of the divider 1201, a window 1213 disposed on the left side of the divider 1202 may be determined to be the window to be downsized. When the position of the handle region is included in the sub-trigger region 1222 including the divider 1202, the window 1213 and a window 1214 may be determined to be the window to be downsized. When the position of the handle region is included in the sub-trigger region 1223 disposed on the right side of the divider 1202, the window 1214 disposed on the right side of the divider 1202 may be determined to be the window to be downsized.

For example, as illustrated in FIG. 12C, the trigger region may be divided into three sub-trigger regions 1224, 1225, and 1226 based on the divider 1203 that splits a screen up and down. The trigger region may be divided into the sub-trigger region 1225 with a preset length including the divider 1203 at a center thereof, and the sub-trigger regions 1224 and 1226 respectively disposed on an upper side and a lower side of the divider 1203. When the position of the handle region is included in the sub-trigger region 1224 disposed on the upper side of the divider 1203, a window 1215 disposed on the upper side of the divider 1203 may be determined to be the window to be downsized. When the position of the handle region is included in the sub-trigger region 1225 including the divider 1203, the window 1215 and a window 1216 may be determined to be the window to be downsized. When the position of the handle region is included in the sub-trigger region 1226 disposed on the lower side of the divider 1203, the window 1216 may be determined to be the window to be downsized.

For example, a length of a sub-trigger region including a divider at a center thereof may be determined to be an arbitrary fixed value, or determined based on a width or height of a screen. The length may be determined based on a size of a touch region receiving a touch input from a user.

Figure 13C:
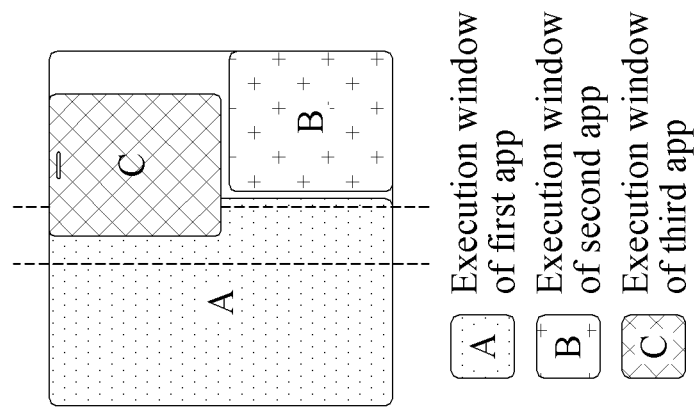
FIGS. 13A, 13B and 13C are diagrams illustrating an example of displaying a position of a pop-up window by changing a layout of a split screen according to various embodiments.
Figure 13B:
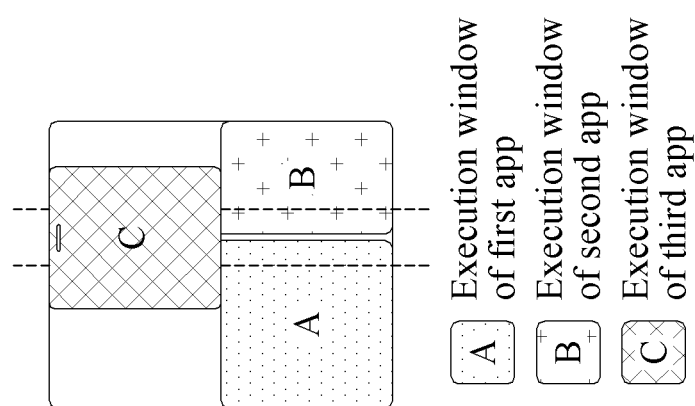
Figure 13A:
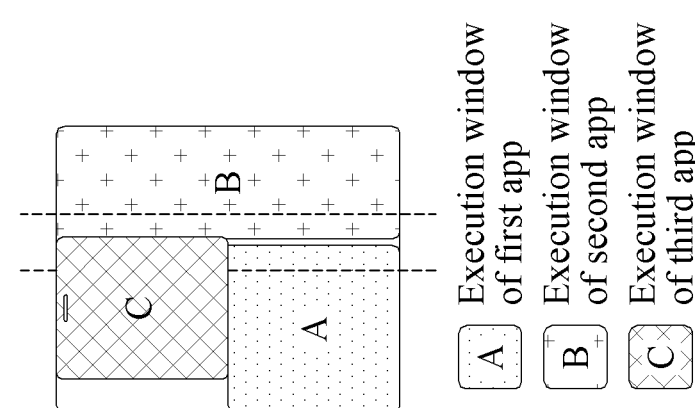

FIGS. 13A, 13B and 13C (which may be referred to as FIGS. 13A through 13C) are diagrams illustrating an example of displaying a position of a pop-up window by changing a layout of a split screen according to various embodiments.

According to an example embodiment, when a downsizing direction and a window to be downsized are determined, a processor may downsize the window in the determined downsizing direction to generate a new window region in which a pop-up window is to be arranged.

For example, FIG. 13A illustrates a layout of a split screen changed when an upper-end trigger region of FIG. 12B is overlaid with a pop-up window and a handle region of the pop-up window is disposed in the sub-trigger region 1221. As described above with reference to FIG. 11A, when a position of the trigger region overlaid with the pop-up window corresponds to an upper end of the split screen, a downsizing direction may be determined to be a downward direction. As described above with reference to FIG. 12B, when a position of the handle region of the pop-up window is included in a sub-trigger region disposed on a left side with respect to a divider, a window disposed on the left side with respect to the divider may be determined to be a window to be downsized. Referring to FIG. 13A, as an execution window of a first app determined to be the window to be downsized is downsized in a determined downward direction, a new region in which the pop-up window is to be arranged may be generated on an upper side of the downsized executed window of the first app.

For example, FIG. 13B illustrates a layout of a split screen changed when an upper-end trigger region of FIG. 12B is overlaid with a pop-up window and a handle region of the pop-up window is disposed in the sub-trigger region 1222. In this example, an execution window of a first app and an execution window of a second app may be determined to be the window to be downsized, and a downsizing direction may be determined to be a downward direction. Based on a result of the determination, a new region in which the pop-up window is to be arranged may be generated on an upper side of the downsized execution window of the first app and the downsized execution window of the second app.

For example, FIG. 13C illustrates a layout of a split screen changed when an upper-end trigger region of FIG. 12B is overlaid with a pop-up window and a handle region of the pop-up window is disposed in the sub-trigger region 1223. In this example, an execution window of a second app may be determined to be the window to be downsized, and a downsizing direction may be determined to be a downward direction. Based on a result of the determination, a new region in which the pop-up window is to be arranged may be generated on an upper side of the downsized execution window of the second app.

Similarly, in a split screen obtained by splitting a screen up and down and a split screen including at least two regions, a downsizing direction and a window to be downsized may be determined. Based on a result of the determination, at least one window may be downsized, and a new region in which a pop-up window is to be arranged may be generated.

For example, the window may be determined to be downsized to be half in width or height of the window, be determined to be downsized by a preset value, or determined based on an input from a user.

Figure 14:
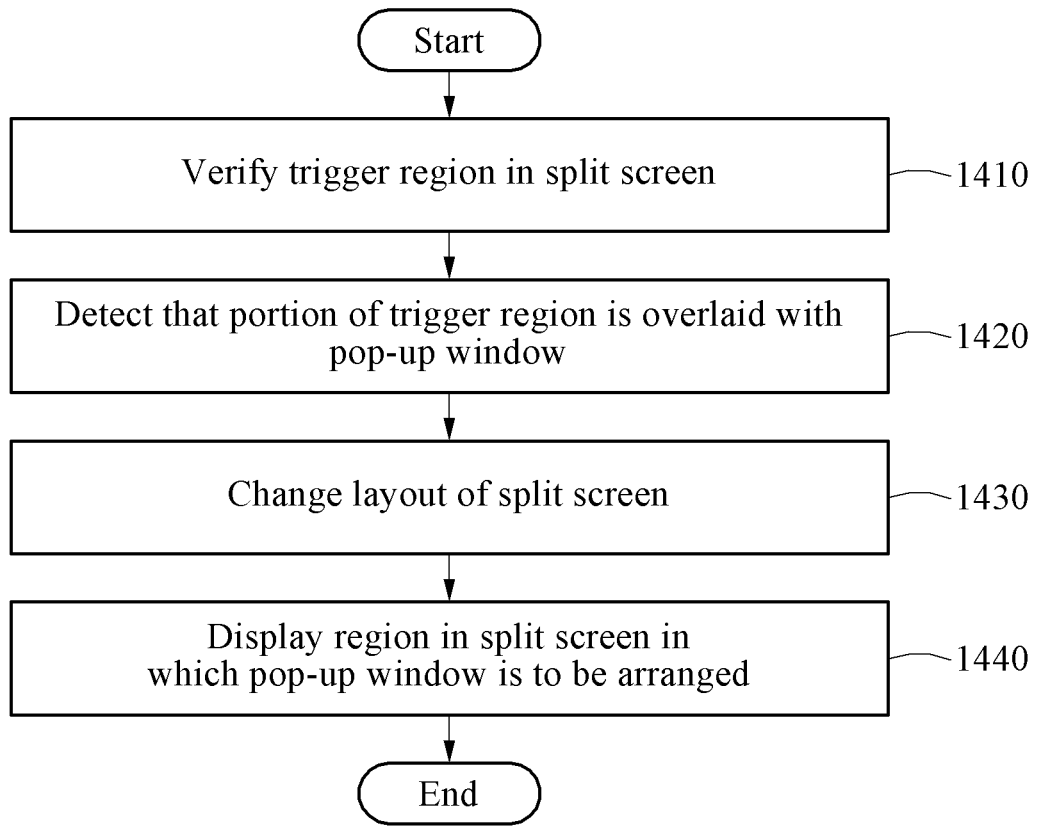
FIG. 14 is a flowchart illustrating an example method of controlling a screen displayed on a display of an electronic device according to various embodiments.

FIG. 14 is a flowchart illustrating an example method of controlling a screen displayed on a display of an electronic device according to various embodiments.

Referring to FIG. 14, a method of controlling a screen displayed on a display of an electronic device may include operation 1410 of verifying a trigger region in a split screen based on a layout of the split screen displayed on the display, operation 1420 of detecting that at least a portion of the trigger region is overlaid with a pop-up window based on a first user input controlling a handle region of the pop-up window displayed on an upper layer of the split screen, operation 1430 of changing the layout of the split screen based on at least one of a position of the portion of the trigger region overlaid with the pop-up window and a relative position of the handle region and a divider of the layout, and operation 1440 of displaying a region in the split screen in which the pop-up window is to be arranged based on the changed layout of the split screen.

Operation 1410 of verifying the trigger region in the split screen may include verifying the trigger region based on a splitting direction of the split screen.

Operation 1430 of changing the layout of the split screen may include determining a downsizing direction of one or more windows included in the split screen based on the position of the portion of the trigger region overlaid with the pop-up window, and determining a window to be downsized among the windows included in the split screen based on the relative position of the handle region and the divider of the layout.

The determining of the downsizing direction of the split screen may include determining the downsizing direction of the split screen to be a direction opposite to the position of the portion of the trigger region overlaid with the pop-up window.

The determining of the window to be downsized may include determining the window to be downsized based on whether the position of the handle region is included in a sub-trigger region determined based on the divider of the layout.

The method may further include generating a new window region in which the pop-up window is to be arranged by downsizing the window in the determined downsizing direction.

Operation 1440 of displaying the region in which the pop-up window is to be arranged may include arranging the pop-up window in a region displayed in the split screen based on a second user input determining a position of the pop-up window.

The arranging of the pop-up window may further include changing a level of the layer on which the pop-up window is displayed to a level of a layer on which the split screen is displayed.

The handle region may include at least a partial region predetermined (e.g., specified) in the pop-up window.

The handle region may be determined based on a region in the pop-up window receiving the first user input.

The split screen may include an execution window of at least one app run on the electronic device.

The pop-up window may include an execution window of a first app run on the electronic device.

Figure 15A:
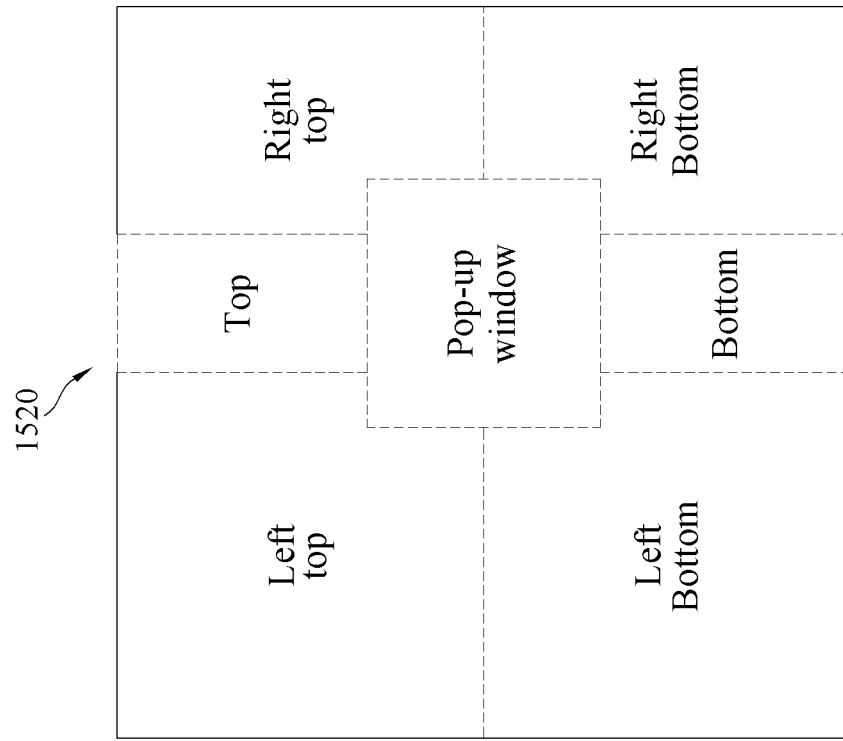
FIGS. 15A and 15B are diagrams illustrating examples of controlling a screen displayed on a display of an electronic device according to various embodiments.
Figure 15B:
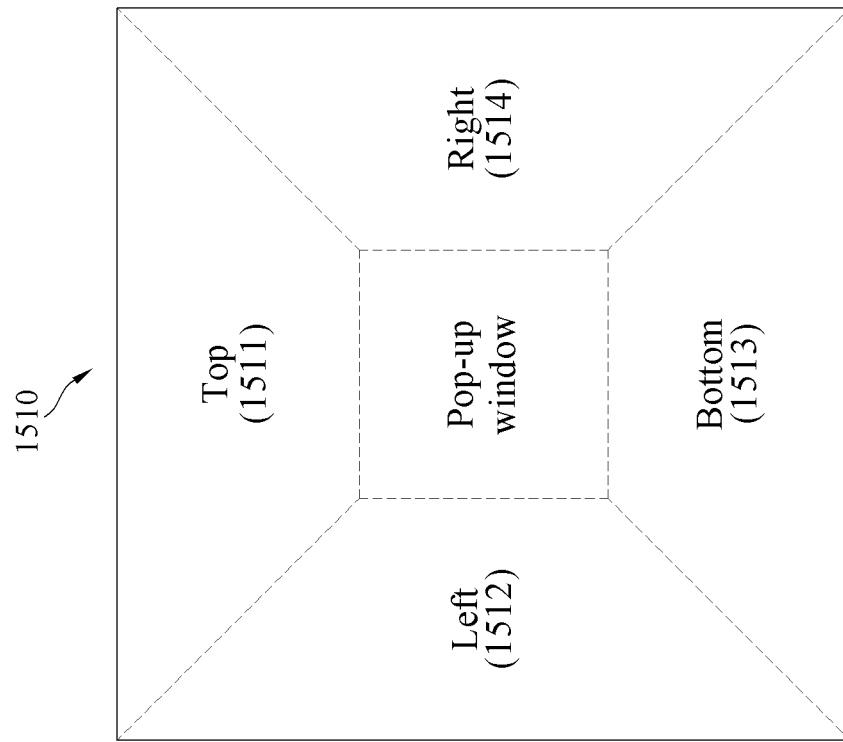

FIGS. 15A and 15B are diagrams illustrating examples of controlling a screen displayed on a display of an electronic device according to various embodiments.

According to an example embodiment, a position of a pop-up window may be determined based on a target region predetermined in a screen. Referring to FIG. 15A, when an execution window of a second app is displayed as a pop-up window on an upper layer of a first screen on which an execution window of a first app is displayed as a full screen, a target region 1510 for determining a position in the first screen at which the pop-up window is to be arranged may be predetermined. According to an example embodiment, in response to an input from a user, a processor may identify a specific region 1511, 1512, 1513, or 1514 within the target region 1510 including the position of the pop-up window, and adjust a layout of the first screen such that the pop-up window is arranged in a partial region in the screen corresponding to the identified region.

For example, in a switch mode, when a position of a specific point in the pop-up window (e.g., a point corresponding to a center of a handle region of the pop-up window) is included in the region 1511 in response to a first user input, the processor may downsize the execution window of the first app downward and arrange the pop-up window at an upper end of the downsized execution window of the first app in the first screen, by a second user input. Similarly, in the switch mode, when the point in the pop-up window is included in the region 1512, the processor may downsize the execution window of the first app rightward and arrange the pop-up window on a left side of the downsized execution window of the first app in the first screen. When the point in the pop-up window is included in the region 1513, the processor may downsize the execution window of the first app upward and arrange the pop-up window at a lower end of the downsized execution window of the first app in the first screen. When the point in the pop-up window is included in the region 1514, the processor may downsize the execution window of the first app leftward and arrange the pop-up window on a right side of the downsized execution window of the first app in the first screen.

Referring to FIG. 15B, when an execution window of a first app is displayed as a pop-up window on an upper layer of a split screen on which execution windows of apps are displayed in a plurality of regions, respectively, a target region 1520 for determining a position in the split screen at which the pop-up window is to be arranged may be predetermined. In response to an input from a user, the processor may identify a specific region in the target region 1520 including the position of the pop-up window, and adjust a layout of the split screen such that the pop-up window is arranged in a partial region in the screen corresponding to the identified region.

According to various example embodiments, an electronic device described herein may be a device of one of various types. The electronic device may include, as non-limiting examples, a portable communication device (e.g., a smartphone, etc.), a computing device, a portable multimedia device, a portable medical device, a camera, a wearable device, a home appliance, or the like. However, the electronic device is not limited to the foregoing examples.

It should be appreciated that various example embodiments of the present disclosure and the terms used therein are not intended to limit the technological features set forth herein to particular example embodiments and include various changes, equivalents, or replacements for a corresponding example embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B," "at least one of A and B," "at least one of A or B," "A, B or C," "at least one of A, B and C," and "A, B, or C," each of which may include any one of the items listed together in the corresponding one of the phrases, or all possible combinations thereof. Terms such as "first," "second," or "first" or "second" may simply be used to distinguish the component from other components in question, and do not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), the element may be coupled with the other element directly (e.g., wiredly), wirelessly, or via a third element.

As used in connection with various example embodiments of the disclosure, the term "module" may include a unit implemented in hardware, software, or firmware, or any combination thereof, and may interchangeably be used with other terms, for example, "logic," "logic block," "part," or "circuitry." A module may be a single integral component, or a minimum unit or part thereof, adapted to perform one or more functions. For example, according to an example embodiment, the module may be implemented in the form of an application-specific integrated circuit (ASIC).

Various example embodiments set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The "non-transitory" storage medium is a tangible device, and may not include a signal (e.g., an electromagnetic wave), but this term does not differentiate between where data is semi-permanently stored in the storage medium and where the data is temporarily stored in the storage medium.

According to various example embodiments, a method according to an example embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components or operations may be omitted, or one or more other components or operations may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method of controlling a screen displayed on a display of an electronic device, the method comprising:
    verifying a trigger region in a screen comprising first execution window of a first application run by the electronic device;
    based on a first input controlling a position of a second execution window of a second application corresponding to a pop-up window displayed on an upper layer of the screen, detecting that at least a portion of the trigger region is overlaid with the pop-up window;
    splitting the screen comprising the first execution window of the first application in a splitting direction determined based on the position of the overlaid portion of the trigger region on the screen; and
    displaying a region in the split screen in which the second execution window is to be arranged,
    wherein the second execution window is arranged at an end of a first side of the split screen, when the overlaid portion of the trigger region is located on the end of the first side of the screen,
wherein at least one of the first execution window and the second execution window is determined to be downsized for additionally arranging a new pop-up window in the split screen where the first execution window and the second execution window are arranged, based on a relative position between a divider of the first execution window and the second execution window in the split screen and a handle region of the new pop-up window.

2. The method of claim 1, wherein the splitting of the screen comprises:
    determining a splitting direction of the screen based on the position of the overlaid portion of the trigger region; and
    splitting the screen based on the determined splitting direction.

3. The method of claim 1, wherein the displaying of the region in which the pop-up window is to be arranged comprises:
    arranging the execution window of the first application in a first region in the split screen based on the position of the overlaid portion of the trigger region; and
    displaying a second region in the split screen as the region in which the pop-up window is to be arranged.

4. The method of claim 1, wherein the screen comprises the execution window of the first application run by the electronic device, and the pop-up window comprises an execution window of a second application run by the electronic device.

5. A non-transitory computer-readable storage medium having stored thereon instructions that, when executed by a processor, cause the processor to perform the operations of claim 1.

6. An electronic device comprising:
a display configured to output a screen; and
a processor including processing circuitry operatively connected to the display and configured to control the screen displayed on the display,
wherein the processor is configured to:
verify a trigger region in the screen comprising first execution window of a first application being run;
based on a first input controlling a position of a second execution window of a second application corresponding to a pop-up window displayed on an upper layer of the screen, detect that at least a portion of the trigger region is overlaid with the pop-up window;
split the screen comprising the first execution window of the first application in a splitting direction determined based on the position of the overlaid portion of the trigger region on the screen; and
display a region in the split screen in which the second execution window is to be arranged,
wherein the second execution window is arranged at an end of a first side of the split screen, when the overlaid portion of the trigger region is located on the end of the first side of the screen,
wherein at least one of the first execution window and the second execution window is determined to be downsized for additionally arranging a new pop-up window in the split screen where the first execution window and the second execution window are arranged, based on a relative position between a divider of the first execution window and the second execution window in the split screen and a handle region of the new pop-up window.

7. The electronic device of claim 6, wherein, for the splitting of the screen, the processor is configured to:
determine a splitting direction of the screen based on the position of the overlaid portion of the trigger region; and
split the screen based on the determined splitting direction.

* * * * *